US012775082B2

(12) United States Patent
Wang et al.

(10) Patent No.: US 12,775,082 B2
(45) Date of Patent: Oct. 27, 2026

(54) DISTANCE MEASUREMENT METHOD, READABLE MEDIUM, AND ELECTRONIC DEVICE

(71) Applicant: HUAWEI TECHNOLOGIES CO., LTD., Shenzhen (CN)

(72) Inventors: Qi Wang, Shenzhen (CN); Lan Peng, Shenzhen (CN); Zhenguo Du, Shenzhen (CN); Liang Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 103 days.

(21) Appl. No.: 18/813,541

(22) Filed: Aug. 23, 2024

(65) Prior Publication Data

US 2024/0411003 A1 Dec. 12, 2024

Related U.S. Application Data

(63) Continuation of application No. PCT/CN2023/075507, filed on Feb. 10, 2023.

(30) Foreign Application Priority Data

Feb. 28, 2022 (CN) ......................... 202210190807.0

(51) Int. Cl.
*G01S 11/14* (2006.01)

(52) U.S. Cl.
CPC .................................... *G01S 11/14* (2013.01)

(58) Field of Classification Search
CPC . G01S 11/14; G01S 5/021; G01S 5/18; G01S 5/0252; G01S 5/02585; G01S 5/20
See application file for complete search history.

(56) References Cited

U.S. PATENT DOCUMENTS 6,680,688 B1 1/2004 Jiang et al.
11,216,092 B2 * 1/2022 Hur ......................... G06F 3/011
(Continued)

FOREIGN PATENT DOCUMENTS

CN 104898111 A 9/2015
CN 105116406 A 12/2015
(Continued)

OTHER PUBLICATIONS

Translation of CN112098936 (Year: 2020).*
(Continued)

*Primary Examiner* — Daniel Pihulic
(74) *Attorney, Agent, or Firm* — HAUPTMAN HAM, LLP

(57) ABSTRACT

A distance measurement method. A first electronic device establishes a communication connection to a second electronic device. The first electronic device receives a distance measurement instruction. The first electronic device receives a plurality of groups of sound wave signals sent by a speaker in the second electronic device. Then, the first electronic device determines, based on the plurality of groups of sound wave signals, a sending moment, and a sound wave velocity, a real-time distance between the first electronic device and the second electronic device when each group of sound wave signals are received by the first electronic device. Finally, the first electronic device continuously refreshes and displays the real-time distance between the first electronic device and the second electronic device that is obtained through calculation to improve display precision.

18 Claims, 25 Drawing Sheets

(56) References Cited

U.S. PATENT DOCUMENTS

| | | | | |
|---|---|---|---|---|
| 2005/0219950 | A1 | 10/2005 | Rowe | |
| 2016/0291141 | A1* | 10/2016 | Han | G01S 5/28 |
| 2018/0239008 | A1 | 8/2018 | Han et al. | |
| 2022/0337322 | A1* | 10/2022 | Winzer | H04B 10/27 |
| 2024/0411003 | A1* | 12/2024 | Wang | G01S 5/18 |

FOREIGN PATENT DOCUMENTS

| | | | | | |
|---|---|---|---|---|---|
| CN | 112098936 | A | * | 12/2020 | G01S 5/20 |
| CN | 112098937 | A | * | 12/2020 | G01S 5/24 |
| CN | 112291710 | A | | 1/2021 | |
| CN | 115201801 | A | * | 10/2022 | G01S 11/14 |
| CN | 116699512 | A | * | 9/2023 | G01S 5/18 |
| CN | 120491087 | A | * | 8/2025 | |
| EP | 1758308 | A1 | * | 2/2007 | G01S 11/14 |
| EP | 4474851 | A1 | * | 12/2024 | G01S 5/18 |
| JP | 2006308493 | A | * | 11/2006 | |
| JP | 2010014570 | A | | 1/2010 | |
| JP | 2011199381 | A | | 10/2011 | |
| JP | 2012042244 | A | | 3/2012 | |
| JP | 2025508880 | A | * | 4/2025 | G01S 5/18 |
| JP | 7775498 | B2 | * | 11/2025 | G01S 5/18 |
| WO | 2017145789 | A1 | | 8/2017 | |
| WO | WO-2019022364 | A1 | * | 1/2019 | G06F 3/165 |
| WO | 2020169202 | A1 | | 8/2020 | |
| WO | 2022001147 | A1 | | 1/2022 | |
| WO | WO-2023160414 | A1 | * | 8/2023 | G01S 5/18 |

OTHER PUBLICATIONS

International Search Report issued in corresponding International Application No. PCT/CN2023/075507, dated Apr. 30, 2023, pp. 1-8.

Japanese Office Action issued in corresponding Japanese Application No. 2024-550686, dated Jun. 10, 2025, pp. 1-7.

Extended European Search Report issued in corresponding European Application No. 23759039.3, dated Apr. 11, 2025, pp. 1-11.

* cited by examiner

100

100

100

100

100

DISTANCE MEASUREMENT METHOD, READABLE MEDIUM, AND ELECTRONIC DEVICE

CROSS-REFERENCE TO RELATED APPLICATIONS

This application is a continuation of International Application No. PCT/CN2023/075507, filed on Feb. 10, 2023, which claims priority to Chinese Patent Application No. 202210190807.0, filed on Feb. 28, 2022. The disclosures of the aforementioned applications are hereby incorporated by reference in their entireties.

TECHNICAL FIELD

The present invention relates to the field of communication technologies, and in particular, to a distance measurement method, a readable medium, and an electronic device.

BACKGROUND

A distance is an important parameter that is to be detected in different scenarios and control. For example, in response to an electronic device being used to search for another electronic device, a distance and an included angle between the two electronic devices are accurately measured by using a radio carrier (UWB) technology, to notify a user of a specific distance and a specific direction of the another electronic device that is searched for, so that accurate search for the another electronic device is implemented. For another example, in response to an electronic device performing multi-screen collaboration with another electronic device, for security, the electronic device can perform the multi-screen collaboration only with another electronic device within a short distance range. In this case, a distance between the electronic device and the another electronic device may be measured to determine in response to performing the multi-screen collaboration between the electronic device and the another electronic device and in response to terminating the multi-screen collaboration between the electronic device and the another electronic device.

SUMMARY

At least one embodiment provides a distance measurement method, a readable medium, and an electronic device. The distance measurement method includes: A first electronic device establishes a communication connection to a second electronic device. The first electronic device generates a distance measurement instruction based on a related operation of a user. The first electronic device receives a plurality of groups of sound wave signals sent by a speaker in the second electronic device, and determines a starting band of each group of sound wave signals in the plurality of groups of received sound wave signals through correlation calculation, to determine a receiving moment at which each group of sound wave signals are received by the first electronic device. Then, the first electronic device determines, based on the receiving moment of each group of sound wave signals, a sending moment of each group of sound wave signals, and a sound wave velocity, a real-time distance between the first electronic device and the second electronic device in response to each group of sound wave signals being received by the first electronic device. Finally, the first electronic device continuously refreshes and displays the real-time distance between the first electronic device and the second electronic device that is obtained through calculation.

In the foregoing distance measurement method, the user performs a related operation on the first electronic device. The second electronic device continuously sends the plurality of groups of sound wave signals, and the first electronic device may determine, based on the plurality of groups of received sound wave signals, an arrival moment corresponding to each group of sound wave signals. The first electronic device may calculate, based on the arrival moment corresponding to each group of sound wave signals, the sending moment corresponding to each group of sound wave signals, and the sound wave velocity, the real-time distance between the first electronic device and the second electronic device in response to each group of sound wave signals arriving at the first electronic device. Based on this, the first electronic device can continuously refresh the real-time distance between the first electronic device and the second electronic device. The foregoing distance measurement method is easy for the user to operate, and improves user experience. In addition, because a frequency of the sound wave is high, a sending interval between two adjacent groups of sound wave signals may be flexibly adjusted. Therefore, a frequency of refreshing the real-time distance by the first electronic device can be ensured. Even in response to the user carrying the first electronic device to move slightly, the first electronic device can accurately display, in real time, a change in the distance between the first electronic device and the second electronic device.

A first aspect of at least one embodiment provides a distance measurement method. The method includes: A first electronic device establishes a communication connection to a second electronic device. The first electronic device detects a distance measurement instruction. The first electronic device detects, at a first moment, a first group of sound wave signals sent by the second electronic device, and determines, based on the first group of sound wave signals and first information corresponding to the first group of sound wave signals, a first distance that is between the first electronic device and the second electronic device and that corresponds to the first moment, where the first information includes first sending time information of sending the first group of sound wave signals by the second electronic device. After determining the first distance, the first electronic device displays the first distance. The first electronic device detects, at a second moment after the first moment, a second group of sound wave signals sent by the second electronic device, and determines, based on the second group of sound wave signals and second information corresponding to the second group of sound wave signals, a second distance that is between the first electronic device and the second electronic device and that corresponds to the second moment, where the second information includes second sending time information of sending the second group of sound wave signals by the second electronic device. After determining the second distance, the first electronic device displays the second distance. The first sending time information includes a sending moment at which the second electronic device sends a first group of sound wave signals. The second sending time information includes a sending moment at which the second electronic device sends a second group of sound wave signals. Alternatively, the second sending time information includes a sending moment at which the second electronic device sends a first group of sound wave signals, and a sending interval between the first group of sound wave signals and the second group of sound wave signals sent by the second electronic device. This is not specifically limited in at least one embodiment.

There are various manners in which the first electronic device establishes the communication connection to the second electronic device. This is not specifically limited in at least one embodiment. For example, the first electronic device and the second electronic device are connected through Bluetooth. The distance measurement instruction refers to instruction information that is generated by the first electronic device based on a user operation and that indicates the first electronic device to interact with the second electronic device, to obtain a real-time distance between the first electronic device and the second electronic device. In at least one embodiment, the distance measurement instruction further carries identification information of the second electronic device, so that interaction with the second electronic device can be accurately established in response to there being a plurality of associated electronic devices around the first electronic device.

The first group of sound wave signals refer to a segment of sound wave signals received by the first electronic device from several groups of sound wave signals sent by the second electronic device. In other words, the second electronic device sends several segments of sound wave signals, and the first electronic device receives, at the first moment, the first group of sound wave signals. The second group of sound wave signals refer to another segment of sound wave signals received by the first electronic device from several groups of sound wave signals sent by the second electronic device. In other words, the second electronic device sends several segments of sound wave signals, and the first electronic device receives, at the second moment, the second group of sound wave signals In at least one embodiment, after the first electronic device receives the first group of sound wave signals, the another segment of sound wave signals subsequently received is the second group of sound wave signals. In at least one embodiment, after receiving the first group of sound wave signals, the first electronic device receives another segment of sound wave signals, and still another segment of sound wave signals subsequently received is the second group of sound wave signals. In other words, the first electronic device further receives another group of sound wave signals between the first group of sound wave signals and the second group of sound wave signals. For example, the first electronic device receives the first group of sound wave signals, a third group of sound wave signals, and the second group of sound wave signals in sequence.

In addition, the first distance that is between the first electronic device and the second electronic device and that corresponds to the first moment is not necessarily determined at the first moment, or is not a distance that is between the first electronic device and the second electronic device and that is displayed at the first moment. The first distance that is between the first electronic device and the second electronic device and that corresponds to the first moment refers to a distance that is between the first electronic device and the second electronic device and that corresponds to the first moment. The first distance may be determined after a short period of delay relative to the first moment, or the first distance may be a distance displayed on the first electronic device after a short period of delay relative to the first moment. The first distance represents a distance between the first electronic device and the second electronic device in response to the first group of sound wave signals arriving at the first electronic device. Similarly, because a principle of the second distance between the first electronic device and the second electronic device is similar to that of the first distance, details are not described in at least one embodiment.

In addition, in at least one embodiment, only a manner of determining the first distance and the second distance in the first electronic device and the second electronic device is described. However, in an actual distance measurement manner, the second distance is a plurality of groups of data. In other words, after the first electronic device determines the second distance between the first electronic device and the second electronic device, the first electronic device continues to update the second distance between the first electronic device and the second electronic device, so that the first electronic device continuously displays the distance between the first electronic device and the second electronic device.

In the foregoing distance measurement method, the first electronic device can continuously refresh the real-time distance between the first electronic device and the second electronic device. The foregoing distance measurement method is easy for the user to operate, and improves user experience. In addition, because a frequency of the sound wave is high, a sending interval between two adjacent groups of sound wave signals may be flexibly adjusted. Therefore, a frequency of refreshing the real-time distance by the first electronic device can be ensured. Even in response to the user carrying the first electronic device to move slightly, the first electronic device can accurately display, in real time, a change in the distance between the first electronic device and the second electronic device.

In at least one embodiment of the first aspect, in the distance measurement method, the first electronic device receives the first information and the second information from the second electronic device. In other words, the first electronic device receives the first sending time information and the second sending time information from the second electronic device.

In other words, in at least one embodiment, the first information and the second information are determined by the second electronic device. The second electronic device can send the first group of sound wave signals based on the first information determined by the second electronic device, and can send the second group of sound wave signals based on the second information. Then, the second electronic device sends the first information and the second information to the first electronic device, so that the first electronic device can determine, based on the received first group of sound wave signals and the first information, the first distance between the first electronic device and the second electronic device in response to the first group of sound wave signals arriving at the first electronic device, and at a same time, the first electronic device can determine, based on the received second group of sound wave signals and the second information, the second distance between the first electronic device and the second electronic device in response to the second group of sound wave signals arriving at the first electronic device.

In the foregoing distance measurement method, before the second electronic device sends a first sound wave signal and a second sound wave signal, the second electronic device does not receive the first information and the second information from the first electronic device or another electronic device. This can effectively shorten a response time before the second electronic device sends the first sound wave signal and the second sound wave signal, properly arrange response periodicities of the first electronic device and the second electronic device, and further improve user experience.

In at least one embodiment of the first aspect, in the distance measurement method, the first electronic device sends the first sending time information and the second sending time information to the second electronic device, so that the second electronic device sends the first group of sound wave signals based on the first sending time information, and the second electronic device sends the second group of sound wave signals based on the second sending time information. The first information includes the first sending time information, and the second information includes the second sending time information.

In other words, in at least one embodiment, the first information and the second information are determined by the first electronic device. After determining the first information and the second information, the first electronic device sends the first information and the second information to the second electronic device.

Then, the second electronic device sends the first group of sound wave signals based on the first information, and sends the second group of sound wave signals based on the second information. Then, the first electronic device determines, based on the received first group of sound wave signals and the first information, the first distance between the first electronic device and the second electronic device in response to the first group of sound wave signals arriving at the first electronic device, and at a same time, the first electronic device can determine, based on the received second group of sound wave signals and the second information, the second distance between the first electronic device and the second electronic device in response to the second group of sound wave signals arriving at the first electronic device.

In the foregoing distance measurement method, the first electronic device does not receive the first information of the first group of sound wave signals and the second information of the second group of sound wave signals from the second electronic device, so that interaction between the first information and the second information between the first electronic device and the second electronic device is reduced, and timeliness and accuracy of the distance measurement method is improved. In addition, the first electronic device may further properly adjust sending time information corresponding to a subsequent group of sound wave signals based on the distance between the first electronic device and the second electronic device that has been determined by the first electronic device.

For example, in response to a first distance value determined by the first electronic device being small, the first electronic device is close to the second electronic device, and the user is about to find the second electronic device. In this case, a sending time interval between the first group of sound wave signals and the second group of sound wave signals may be shortened, in other words, a difference between first time and second time may be reduced, to improve display precision of the distance between the first electronic device and the second electronic device, so that in response to the first electronic device moving slightly, the first electronic device can also accurately capture a distance difference between the first electronic device and the second electronic device.

For another example, in response to a first distance value determined by the first electronic device being small, the first electronic device is close to the second electronic device, and the user is about to find the second electronic device. In this case, a relative movement speed between the first electronic device and the second electronic device may be slowed down, to improve display precision of the distance between the first electronic device and the second electronic device, so that in response to the first electronic device moving slightly, the first electronic device can also accurately capture a distance difference between the first electronic device and the second electronic device.

In addition, in at least one embodiment of the first aspect, in the distance measurement method, the first information is determined by the first electronic device, the second information is determined by the second electronic device, the first electronic device sends the first information to the second electronic device, and the second electronic device sends the second information to the first electronic device. Alternatively, the second information is determined by the first electronic device, the first information is determined by the second electronic device, the first electronic device sends the second information to the second electronic device, and the second electronic device sends the first information to the first electronic device.

In addition, in at least one embodiment of the first aspect, in the distance measurement method, the first information and the second information is determined by a third electronic device, and the first electronic device and the second electronic device obtain the first information and the second information.

Any combination of the foregoing implementations falls within the protection scope of at least one embodiment. This is not specifically limited in at least one embodiment.

In at least one embodiment of the first aspect, the distance measurement method further includes: The first electronic device detects, at a fifth moment, a third group of sound wave signals sent by the second electronic device. The fifth moment is between the first moment and the second moment. Further, the first electronic device determines, based on the first group of sound wave signals, the third group of sound wave signals, the first information, and third information corresponding to the third group of sound wave signals, the first distance that is between the first electronic device and the second electronic device and that is at the first moment. The first electronic device determines, based on the second group of sound wave signals, the third group of sound wave signals, the second information, and the third information, the second distance that is between the first electronic device and the second electronic device and that corresponds to the second moment.

In other words, in at least one embodiment, the first electronic device receives the first group of sound wave signals and the third group of sound wave signals at the first moment, and the first electronic device determines, based on the first group of sound wave signals, the third group of sound wave signals, the first information corresponding to the first sound wave signals, and the third information corresponding to the third group of sound wave signals, the first distance that is between the first electronic device and the second electronic device and that corresponds to the first moment. The third information includes third sending time information of sending the third group of sound wave signals by the second electronic device. For example, the third information includes a sending time at which the second electronic device sends the third group of sound wave signals. For another example, the third information includes a sending time at which the second electronic device sends the third group of sound wave signals and a sending interval between the third group of sound wave signals and the first sound wave signal. This is not specifically limited in at least one embodiment.

In the foregoing distance measurement method, in response to receiving the plurality of groups of sound wave signals sent by the second electronic device, the first electronic device may determine and display a distance between the first electronic device and the second electronic device based on a preset display frequency. In this way, the first electronic device can properly adjust a display manner of the distance between the first electronic device and the second electronic device based on an actual display usage. This implements effective display between the first electronic device and the second electronic device, and improves user experience.

In at least one embodiment of the first aspect, the distance measurement method further includes: The first electronic device sends a sound emitting instruction to the second electronic device, where the sound emitting instruction indicates the second electronic device to send sound wave signals, and the sound wave signals include the first group of sound wave signals and the second group of sound wave signals.

The sound emitting instruction refers to instruction information that is sent by the first electronic device to the second electronic device, and indicates the second electronic device to start to send the sound wave signal. The sound emitting instruction may further include parameters such as a sending moment, a sending interval, or a sound wave wavelength (that is, a sound wave frequency band) of the sound wave signal sent by the second electronic device. This is not specifically limited in at least one embodiment.

In other words, in at least one embodiment, after establishing a communication connection to the second electronic device, the first electronic device can send the sound emitting instruction to the second electronic device, so that the second electronic device starts to send the sound wave signal in response to the sound emitting instruction. In the distance measurement method, the first electronic device can control in response to the second electronic device making a sound, to avoid that the second electronic device still makes a sound continuously in a scenario in which distance measurement is not used. This improves energy efficiency utilization.

In at least one embodiment of the first aspect, in the distance measurement method, the sound emitting instruction indicates the second electronic device to send sound wave signals, and a frequency range of the sound wave signals is a preset frequency range.

In other words, in at least one embodiment, the first electronic device is configured to indicate the second electronic device to send a sound wave signal within the preset frequency range. This facilitates the first electronic device to distinguish the sound wave signal of the second electronic device, to avoid confusion with a sound wave signal sent by another electronic device. In addition, this narrows down the frequency range of the sound wave signals, reduces a difficulty in processing the sound wave signal by the first electronic device, and improves efficiency of processing the sound wave signal by the first electronic device.

In at least one embodiment of the first aspect, the distance measurement method further includes: The first electronic device establishes a Bluetooth connection to the second electronic device, and in response to received signal strength of a Bluetooth signal that is sent by the second electronic device and that is received by the first electronic device being greater than a preset strength threshold. The first electronic device starts to detect the sound wave signals sent by the second electronic device. The sound wave signal includes a first sound wave signal and a second sound wave signal.

The received signal strength of the Bluetooth signal represents strength of the Bluetooth signal that is sent by the second electronic device and that is received by the first electronic device, and may also be understood as an association between the first electronic device and the second electronic device in a current state. For example, a larger received signal strength value indicates that the first electronic device is closer to the second electronic device, in other words, the association between the second electronic device and the first electronic device is stronger, stability of the Bluetooth connection between the first electronic device and the second electronic device is higher, and the user is able to search for the second electronic device by using the first electronic device. A smaller received signal strength value indicates that the first electronic device is farther away from the second electronic device, in other words, the association between the second electronic device and the first electronic device may be weaker, and the user cannot search for the second electronic device by using the first electronic device. The preset strength threshold is an approximate value of the received signal strength indication that is determined based on association strength between the first electronic device and the second electronic device. The preset strength threshold is used to determine whether the first electronic device is close to the second electronic device.

In other words, in at least one embodiment, in response to the first electronic device being connected to the second electronic device through Bluetooth, the first electronic device roughly determines a distance degree between the first electronic device and the second electronic device by using the received signal strength of the Bluetooth signal received by the first electronic device from the second electronic device, and in response to the first electronic device being close to the second electronic device, the first electronic device starts to detect the sound wave signal sent by the second electronic device, where the sound wave signal includes the first sound wave signal and the second sound wave signal.

In the foregoing distance measurement method, in response to the first electronic device starting to detect the sound wave signal sent by the second electronic device can be determined based on the received signal strength of the Bluetooth signal received by the first electronic device from the second electronic device. This improves effectiveness of determining the distance between the first electronic device and the second electronic device by the first electronic device, and avoids invalid measurement of the distance between the first electronic device and the second electronic device by the first electronic device in response to Bluetooth connection strength between the first electronic device and the second electronic device being weak.

In at least one embodiment of the first aspect, the distance measurement method further includes: The first electronic device performs, at a third moment, Bluetooth time synchronization with the second electronic device, to determine a first time offset that is between the first electronic device and the second electronic device and that corresponds to the third moment. The first electronic device determines, based on the first time offset, the first group of sound wave signals, and the first information, a first distance after the third moment, and the first electronic device determines, based on the first time offset, the second group of sound wave signals, and the second information, a second distance after the third moment.

The Bluetooth time synchronization refers to that a time offset between the first electronic device and the second electronic device is determined by using a Bluetooth module in the first electronic device and a Bluetooth module in the second electronic device. The time offset refers to a deviation of time displayed on the first electronic device and the second electronic device. The first time offset refers to a deviation of time displayed on the first electronic device and the second electronic device after the third moment.

The first electronic device and the second electronic device each have a clock, and therefore, time corresponding to the first electronic device and time corresponding to the second electronic device can be separately obtained by statistics. However, in some cases, due to a setting error or a structural error, the time corresponding to the first electronic device may be inconsistent with the time corresponding to the second electronic device, and the inconsistency may be reduced through the Bluetooth time synchronization. A specific implementation of obtaining the time offset between the first electronic device and the second electronic device during the Bluetooth time synchronization is described in detail in the following, and details are not described herein again. In addition, the third moment is only used to distinguish between the first moment and the second moment, and does not represent a sequence relationship. In some implementations, the third moment is before the first moment. In another alternative implementation, the third moment is after the first moment. For example, the third moment is between the first moment and the second moment. This is not specifically limited in at least one embodiment.

In the foregoing distance measurement method, the time offset between the first electronic device and the second electronic device is comprehensively considered, so that a measurement result error caused by inconsistent display time of the first electronic device and the second electronic device in distance measurement calculation can be reduced, and accuracy of a measured distance between the first electronic device and the second electronic device can be improved.

In at least one embodiment of the first aspect, the distance measurement method further includes: The first electronic device performs, at a fourth moment after preset duration of the third moment, Bluetooth time synchronization with the second electronic device, to determine a second time offset that is between the first electronic device and the second electronic device and that corresponds to the fourth moment. The first electronic device determines, based on the second time offset, the first group of sound wave signals, and the first information, a first distance after the fourth moment, and the first electronic device determines, based on the second time offset, the second group of sound wave signals, and the second information, a second distance after the fourth moment.

The second time offset refers to a deviation of time displayed on the first electronic device and the second electronic device after the fourth moment. The fourth moment is after the third moment. In addition, the fourth moment is only used to distinguish the first moment, the second moment, and the third moment, and does not represent a sequence relationship between the fourth moment and the first moment and between the fourth moment and the second moment. In some implementations, the fourth moment is after the first moment and the second moment. In another alternative implementation, the fourth moment is after the second moment. This is not specifically limited in at least one embodiment.

In at least one embodiment of the first aspect, a time interval between the third moment and the fourth moment is a fixed value. For example, the time interval between the third moment and the fourth moment is a preset time threshold. In other words, each time after the preset time threshold is reached, the first electronic device and the second electronic device perform Bluetooth time synchronization.

In the foregoing distance measurement method, in response to the first electronic device and the second electronic device restarting Bluetooth time synchronization at the fourth moment, after the Bluetooth time synchronization ends, an updated time offset is obtained, and the real-time distance calculation formula is updated. Based on this, in response to the first electronic device and the second electronic device periodically performing Bluetooth time synchronization, so that time drift (that is, the time offset) between the first electronic device and the second electronic device may be corrected. This ensures accuracy of a distance measurement result.

In at least one embodiment of the first aspect, the distance measurement method further includes: The first electronic device detects the distance measurement instruction in response to the first electronic device detecting a distance measurement operation performed by the user on the first electronic device and the second electronic device and/or a search operation performed by the user on the second electronic device.

In at least one embodiment of the first aspect, in the distance measurement method, a frequency range of the sound wave signals is 20 Hz to $2*10^4$ Hz. Alternatively, a frequency range of the sound wave signals is $2*10^4$ Hz to $10^{12}$ Hz. Alternatively, a frequency range of the sound wave signals is 20 Hz to $10^{12}$ Hz. For example, the frequency range of the sound wave signals is $1.8*10^4$ Hz to $2.2*10^4$ Hz.

A second aspect of at least one embodiment provides an electronic device. The electronic device includes a memory, configured to store instructions; and one or more processors. In response to the instructions being executed by the one or more processors, the processor performs the distance measurement method according to any one of the first aspect or at least one embodiment of the first aspect.

A third aspect of at least one embodiment provides a computer-readable storage medium. The computer-readable storage medium stores instructions, and in response to the instructions being executed on an electronic device, the electronic device is enabled to perform the distance measurement method according to any one of the first aspect or at least one embodiment of the first aspect.

A fourth aspect of at least one embodiment provides a computer program product. The computer program product includes instructions, and in response to the instructions being executed by one or more processors, the instructions are used to implement the distance measurement method according to any one of the first aspect or at least one embodiment of the first aspect.

BRIEF DESCRIPTION OF DRAWINGS

FIG. 1(*b*) shows at least one embodiment to which a distance measurement method according to at least one embodiment;

FIG. 3(*b*) shows an operation interface of a mobile phone 100 applicable to a distance measurement method according to at least one embodiment;

FIG. 5(*b*) shows a distance $d_2$ between a mobile phone 100 and a Tag device 200 at a moment $t_{32}$;

FIG. 5(*c*) shows a distance $d_3$ between a mobile phone 100 and a Tag device 200 at a moment $t_{33}$;

FIG. 10(*b*) is a diagram of a distance measurement method according to at least one embodiment, where first information includes a sending moment of a sound wave signal, and second information includes a sending interval between a second group of sound wave signals and a first group of sound wave signals;

FIG. 10(*c*) is a diagram of a distance measurement method according to at least one embodiment, where first information includes a sending moment of a sound wave signal, and second information includes a sending interval between a second group of sound wave signals and a first group of sound wave signals, where the sending interval is a fixed value;

Figure 1A:
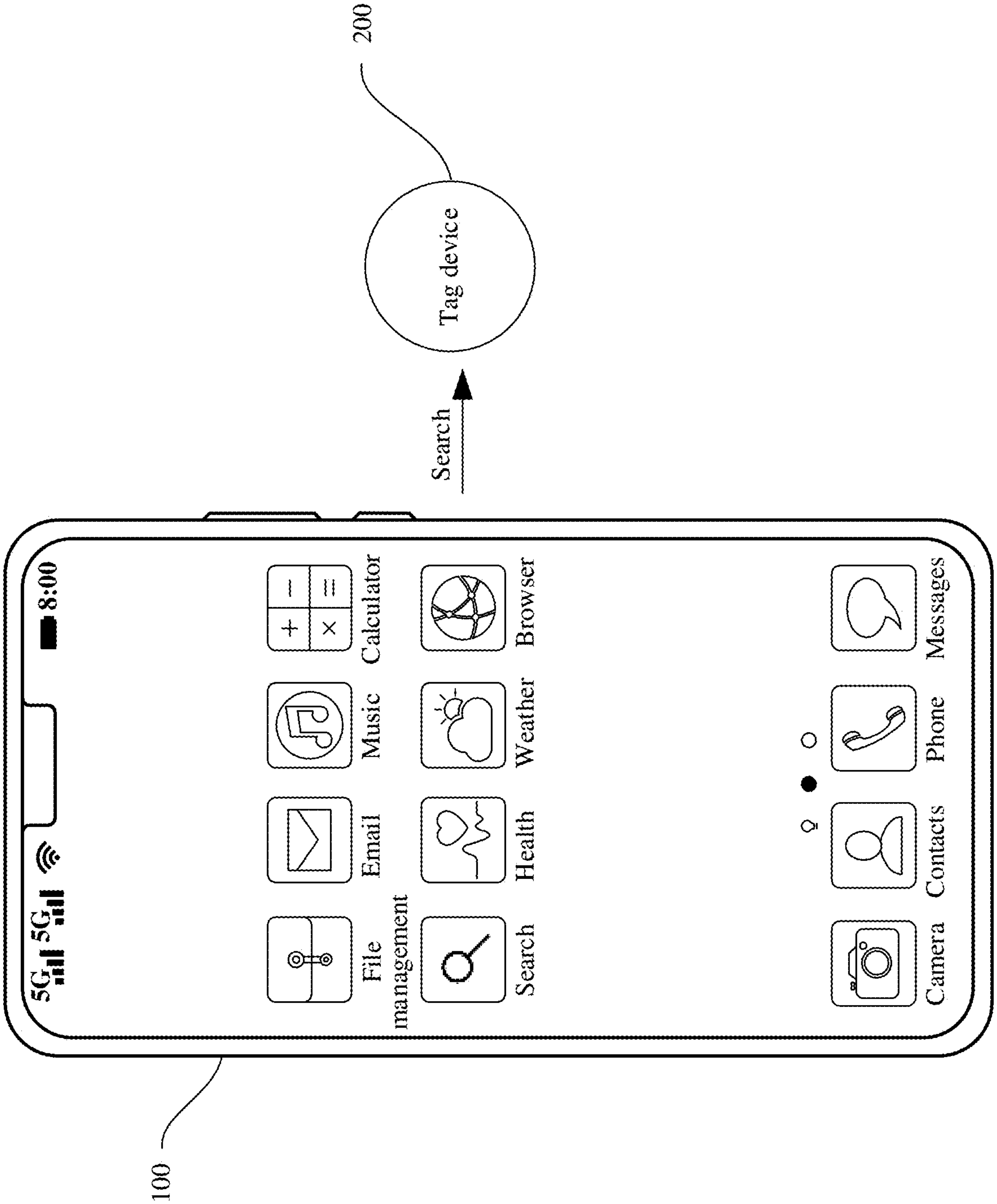
FIG. 1(*a*) shows at least one embodiment to which a distance measurement method according to at least one embodiment.

Reference numerals: 100—Mobile phone; 101—Communication module; 101*a*—Bluetooth module; 102—Audio module; 102*a*—Microphone; 103—Processor; 104—Memory; 105—Display module; 200—Tag device; 201—Communication module; 201*a*—Bluetooth module; 202—Audio module; 202*a*—Speaker; 203—Processor; 204—Memory; and 205—Display module.

DESCRIPTION OF EMBODIMENTS

Illustrative embodiments include but are not limited to a distance measurement method, an apparatus, a readable medium, and an electronic device.

To make the objectives, technical solutions, and advantages of at least one embodiment clearer, the following further describes implementations of at least one embodiment in detail with reference to the accompanying drawings.

Figure 1B:
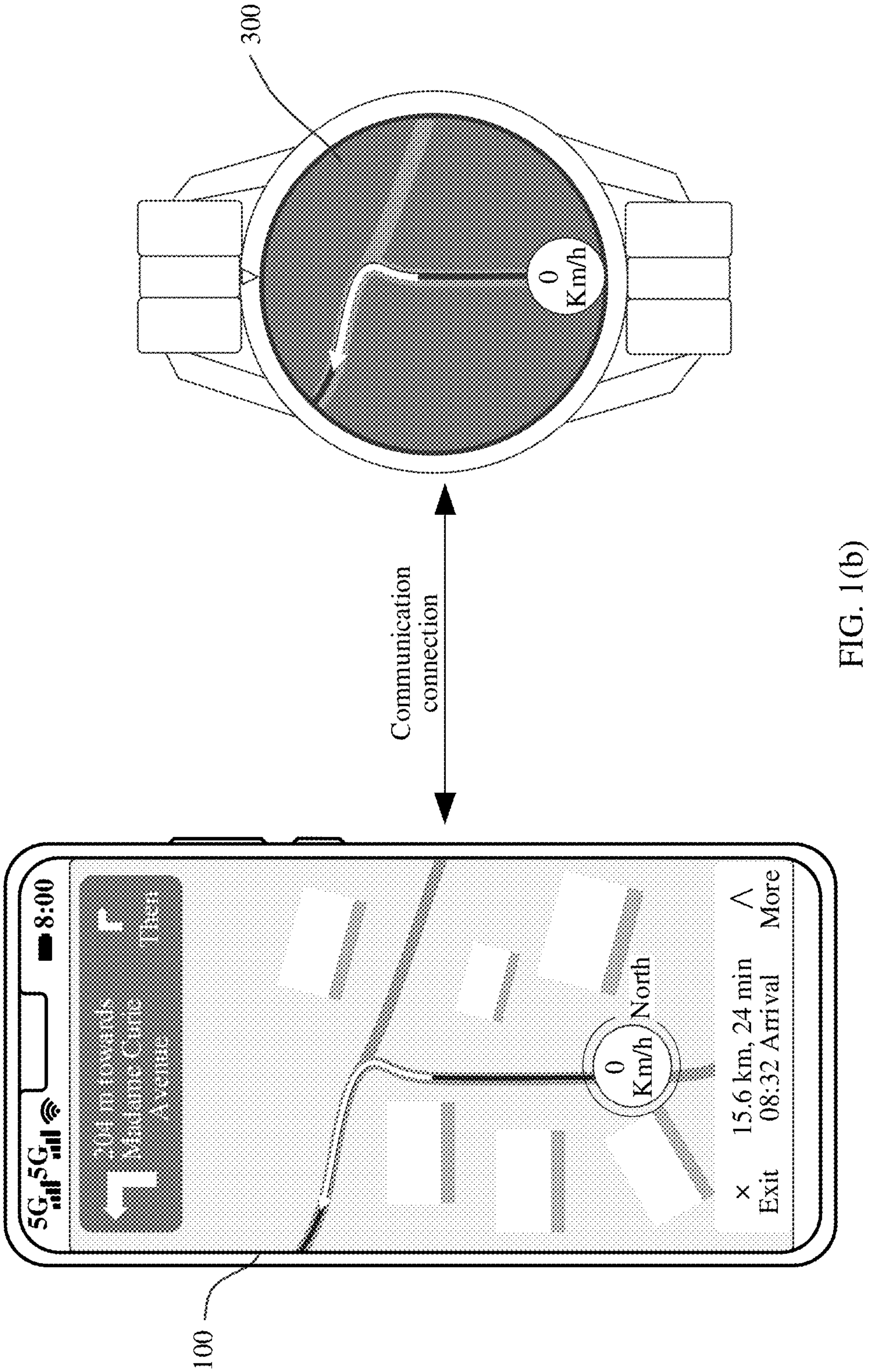

A measurement system applicable to the distance measurement method in at least one embodiment includes a first electronic device (for example, a mobile phone 100 in FIG. 1(*a*) or FIG. 1(*b*)) and a second electronic device (for example, an electronic tag device 200 in FIG. 1(*a*) or a watch 300 in FIG. 1(*b*)), and the distance measurement solution can be applied to a plurality of scenarios.

In at least one embodiment, for example, as shown in FIG. 1(*a*), the distance measurement method provided in at least one embodiment may be applied to a scenario in which a user searches for the Tag device 200 by using the mobile phone 100, to find an item such as a backpack, a bicycle, or a key. The Tag device 200 is an electronic tag device indicating an item, and generally includes a Bluetooth module and a speaker. Specifically, to facilitate searching for an item, such as the backpack, the bicycle, or the key, that cannot be directly identified by an electronic device, the Tag device 200 is generally added to this type of item. In response to the user wanting to know a specific location of the backpack, the bicycle, or the key, the user operates the mobile phone 100 to connect to the Tag device 200 through Bluetooth, and determines a distance between the mobile phone 100 and the Tag device 200 by receiving a sound wave sent by a speaker in the Tag device 200, to provide a reference for the user to search for the item such as the backpack, the bicycle, or the key, and reduce a search difficulty for the user.

In at least one embodiment, for another example, as shown in FIG. 1(*b*), the distance measurement method provided in at least one embodiment may alternatively be applied to a scenario in which the mobile phone 100 and the watch 300 are paired and interacted. For example, in multi-screen collaboration, for security, the multi-screen collaboration can be performed only in response to a distance between the mobile phone 100 and the watch 300 being within a specific range. In response to a user wanting to implement the multi-screen collaboration between the mobile phone 100 and the watch 300, the user may determine, by measuring the distance between the mobile phone 100 and the watch 300, in response to performing the multi-screen collaboration between the mobile phone 100 and the watch 300 and in response to terminating the multi-screen collaboration between the mobile phone 100 and the watch 300, to accurately determine a multi-screen collaboration condition, and improve multi-screen collaboration security.

To better understand the technical solutions of at least one embodiment, the following describes the technical solutions of at least one embodiment in detail by using an application scenario in which a user searches for a Tag device 200 by using a mobile phone 100 as an example.

Figure 2:
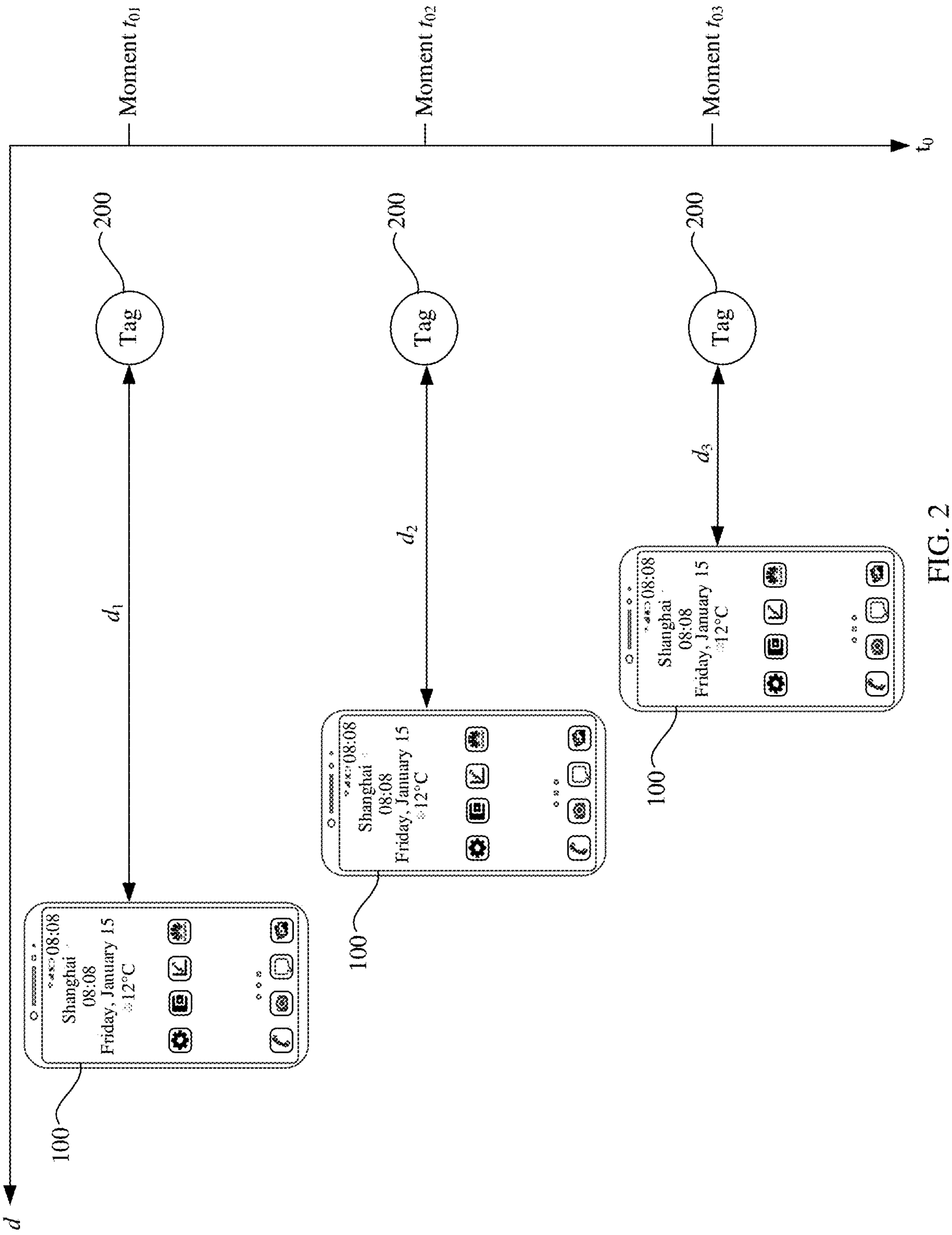
FIG. 2 shows a search scenario to which a distance measurement method is applicable according to at least one embodiment.

As shown in FIG. 2, in response to the user wanting to search for the Tag device 200 by using the mobile phone 100, the user may perform a first search operation for the Tag device 200 on the mobile phone 100 (for example, tap/click a search button corresponding to the Tag device 200), to obtain a first distance $d_1$ between the mobile phone 100 and the Tag device 200 at a moment $t_{01}$, and present the first distance $d_1$ to the user, so that the user can adjust a location of the mobile phone 100 based on the first distance $d_1$. Then, the user is to perform a second search operation for the Tag device 200 on the mobile phone 100 (for example, tap/click a search button corresponding to the Tag device 200 for a second time), to obtain a second distance $d_2$ between the mobile phone 100 and the Tag device 200 at a moment $t_{02}$, and present the second distance $d_2$ to the user, so that the user can continue to adjust the location of the mobile phone 100 based on the first distance $d_1$ and the second distance $d_2$, until a distance $d_3$ between the mobile phone 100 and the Tag device 200 meets a usage, for example, the user finds the Tag device 200.

In at least one embodiment shown in FIG. 2, in response to the mobile phone 100 displaying a real-time distance between the mobile phone 100 and the Tag device 200, the Tag device 200 is found by using the mobile phone 100. However, in a current distance measurement method, a distance between the mobile phone 100 and the Tag device 200 can be measured at a moment only after the user performs a search operation each time. Therefore, the user is to operate the mobile phone 100 for a plurality of times to measure the distance between the mobile phone 100 and the Tag device 200 for a plurality of times at a plurality of moments. In this case, the operation is complex, and user experience is poor. In addition, in the current distance measurement method, the distance between the mobile phone 100 and the Tag device 200 cannot be refreshed in time in response to the mobile phone 100 moving relative to the Tag device 200, in other words, a reference cannot be provided for the user in time. Consequently, searching for the Tag device 200 is difficult by using the mobile phone 100, and search efficiency is low.

Figure 3A:
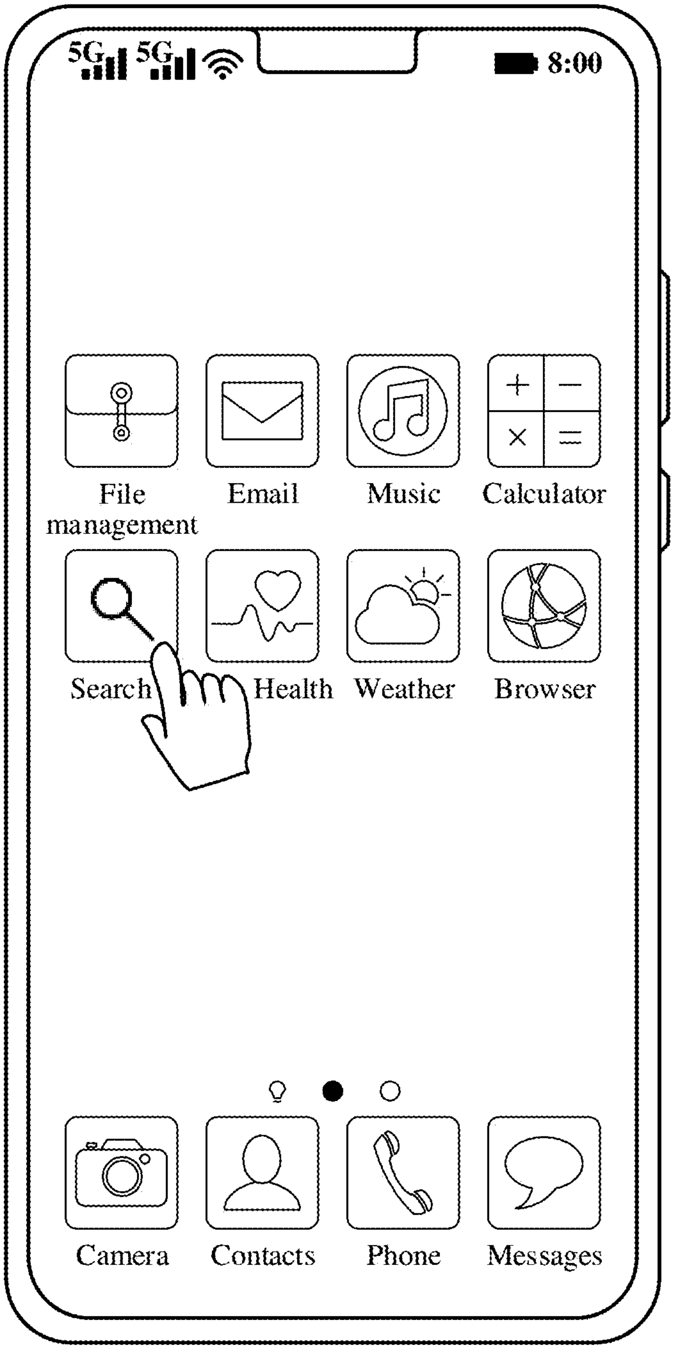
FIG. 3(*a*) shows a home screen of a mobile phone 100 applicable to a distance measurement method according to at least one embodiment.
Figure 3B:
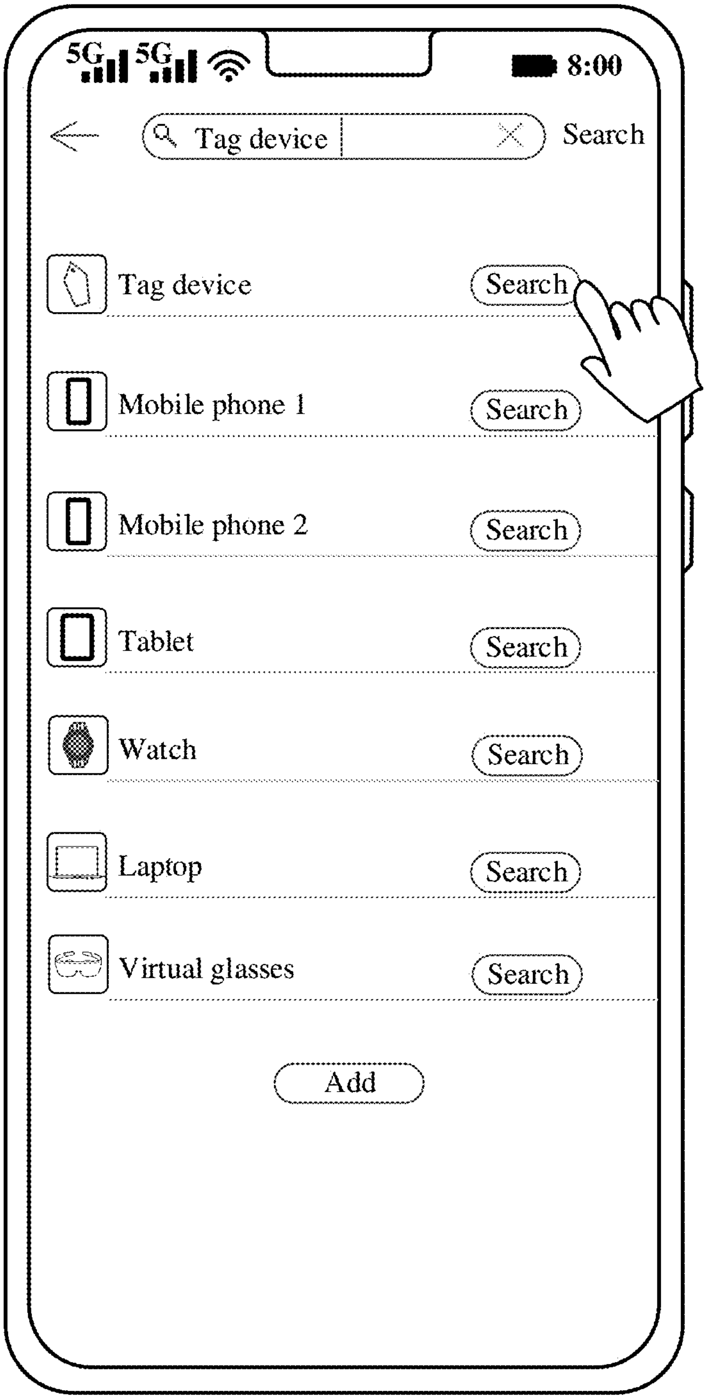

Therefore, at least one embodiment provides a distance measurement method between electronic devices. As shown in FIG. 3(*a*) to FIG. 5(*c*), after a mobile phone 100 establishes a wireless communication connection to a Tag device 200, a user performs a search operation for the Tag device 200 on the mobile phone 100. For example, the search operation may include a start operation of starting a search program in FIG. 3(*a*) and a search confirmation operation for the Tag device 200 in FIG. 3(*b*). Then, the mobile phone 100 receives a plurality of groups of sound wave signals sent by a speaker in the Tag device 200, and determines a starting band of each group of sound wave signals in the plurality of groups of received sound wave signals through correlation calculation, to determine a receiving moment (for example, $t_{21}$, $t_{22}$, $t_{23}$, and $t_{2k}$ in FIG. 4) at which each group of sound wave signals are received by the mobile phone 100. Then, the mobile phone 100 determines, based on the receiving moment (for example, $t_{21}$, $t_{22}$, $t_{23}$, and $t_{2k}$ in FIG. 4) of each group of sound wave signals, a sending moment (for example, $t_{11}$, $t_{12}$, $t_{13}$, and $t_{1k}$ in FIG. 4) of each group of sound wave signals, and a sound wave velocity (for example, v in FIG. 4), a real-time distance (for example, $d_1$, $d_2$, $d_3$, and $d_k$ in FIG. 4) between the mobile phone 100 and the Tag device 200 in response to each group of sound wave signals being received by the mobile phone 100. Finally, the mobile phone 100 continuously refreshes and displays the real-time distance between the mobile phone 100 and the Tag device 200 that is obtained through calculation. For example, as shown in FIG. 5(*a*), the mobile phone 100 displays "5.3 m away from a Tag device" at a moment $t_{01}$. For another example, as shown in FIG. 5(*b*), the mobile phone 100 displays "5.7 m away from a Tag device" at a moment $t_{02}$. For another example, as shown in FIG. 5(*c*), the mobile phone 100 displays "4.9 m away from a Tag device" at a moment $t_{03}$.

In the foregoing distance measurement method, the user performs the search operation on the mobile phone 100 once, the Tag device 200 continuously sends the plurality of groups of sound wave signals, and the mobile phone 100 may determine, based on the plurality of groups of received sound wave signals, an arrival moment corresponding to each group of sound wave signals. The mobile phone 100 may calculate, based on the arrival moment corresponding to each group of sound wave signals, the sending moment corresponding to each group of sound wave signals, and the sound wave velocity, the real-time distance between the mobile phone 100 and the Tag device 200 in response to each group of sound wave signals arriving at the mobile phone 100. Based on this, the mobile phone 100 can continuously refresh the real-time distance between the mobile phone 100 and the Tag device 200. The distance measurement method is easy for the user to operate, and improves user experience. In addition, because a frequency of the sound wave is high, a sending interval between two adjacent groups of sound wave signals may be flexibly adjusted. Therefore, a frequency of refreshing the real-time distance by the mobile phone 100 can be ensured. Even in response to the user carrying the mobile phone 100 to move slightly, the mobile phone 100 can accurately display, in real time, a change in the distance between the mobile phone 100 and the Tag device 200, so that the user can adjust a solution of searching for the Tag device 200 in time. This reduces a difficulty in searching for the Tag device 200 by the user.

In addition to the mobile phone 100, the first electronic device mentioned above in at least one embodiment may be any portable and mobile electronic device, such as a watch, a tablet computer, a notebook computer, a Tag device, a laptop computer, a wearable device, a head-mounted display, a portable game console, a portable music player, or a reader device. In addition to the Tag device 200, the second electronic device may also be any portable and mobile electronic device, such as a mobile phone, a watch, a tablet computer, a notebook computer, a laptop computer, a wearable device, a head-mounted display, a portable game console, a portable music player, or a reader device. In addition, example embodiments of the first electronic device and the second electronic device include but are not limited to various electronic devices running a Linux operating system, an operating system (Windows) developed by Microsoft, a mobile operating system (iOS) developed by Apple, an Android open-source operating system, a Harmony operating system (HUAWEI Harmony OS), or another operating system. This is not specifically limited in at least one embodiment.

Figure 4:
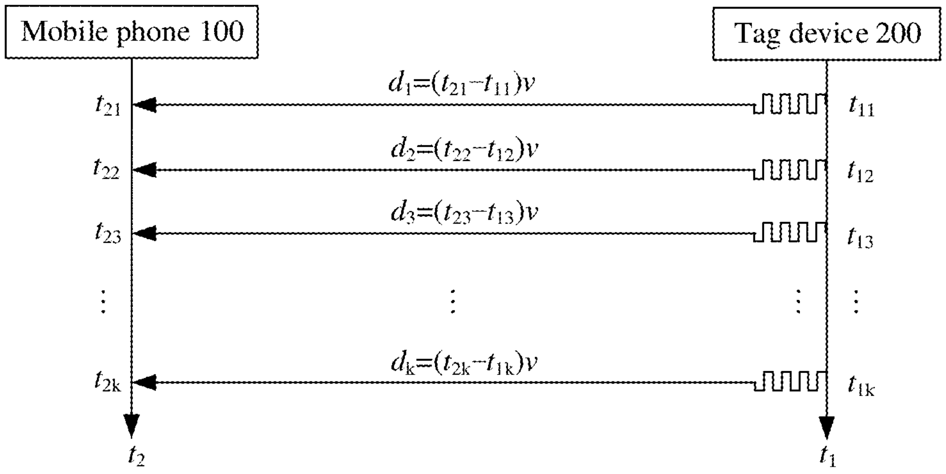
FIG. 4 is a diagram of distance measurement between a mobile phone 100 and a Tag device 200 according to at least one embodiment.
Figure 5A:
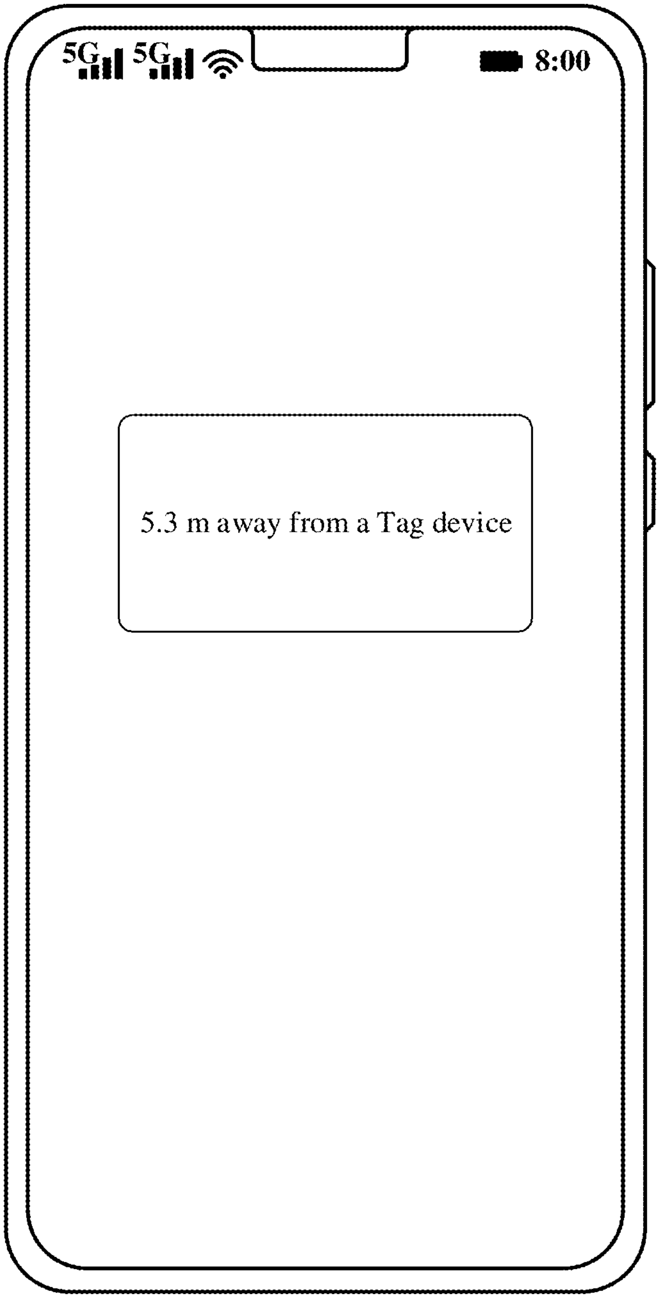
FIG. 5(*a*) shows a distance $d_1$ between a mobile phone 100 and a Tag device 200 at a moment $t_{31}$.
Figure 5B:
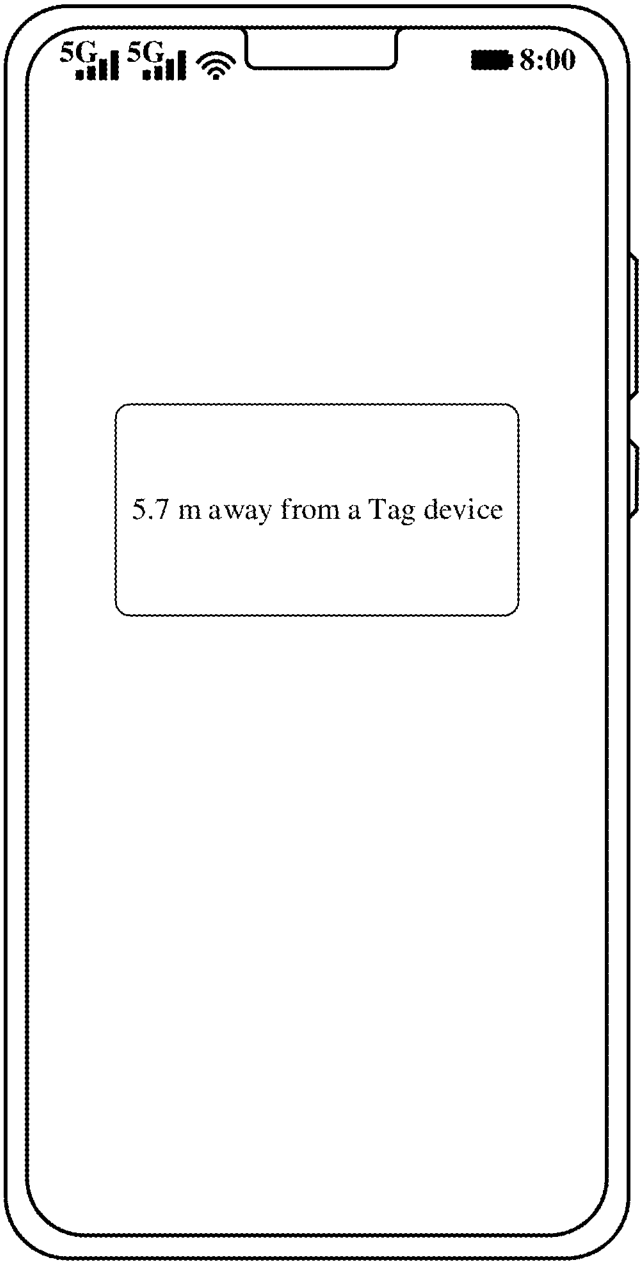
Figure 5C:
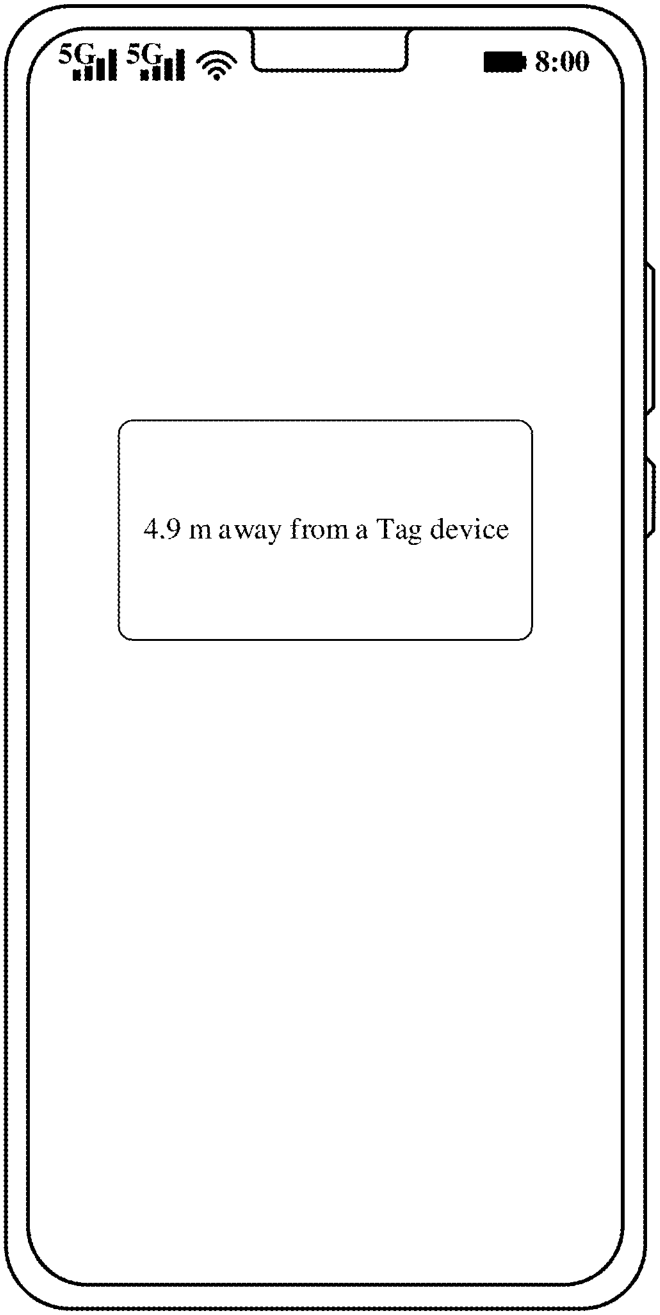

For ease of description, the following continues to describe in detail the distance measurement method in at least one embodiment with reference to FIG. 3 and FIG. 4 by using an example in which the first electronic device is the mobile phone 100 and the second electronic device is the Tag device 200.

Figure 6:
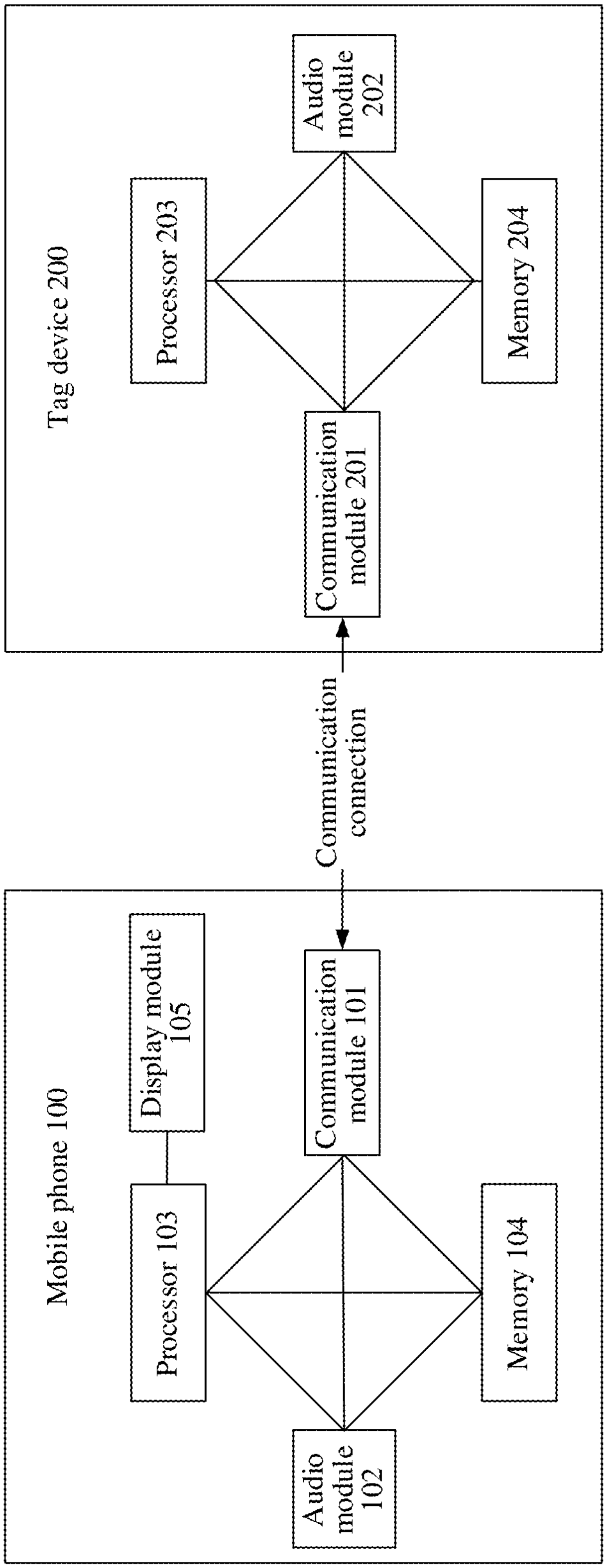
FIG. 6 is a diagram of a structure of a mobile phone 100 and a Tag device 200 according to at least one embodiment.

FIG. 6 is a diagram of a structure of a mobile phone 100 and a Tag device 200 according to at least one embodiment. As shown in FIG. 6, in at least one embodiment, the mobile phone 100 includes a communication module 101, an audio module 102, a processor 103, a memory 104, and a display module 105. The Tag device 200 includes a communication module 201 and an audio module 202. The communication module 101, the audio module 102, the processor 103, and the display module 105 are connected through a bus, to implement data exchange. The communication module 201 establishes signal connection to the audio module 202, to implement data exchange. The communication module 101 and the communication module 201 are configured to establish a communication connection between the mobile phone 100 and the Tag device 200. For example, the communication module 101 and the communication module 201 may be Bluetooth modules. The audio module 102 and the audio module 202 are configured to send and/or receive a sound wave signal. For example, the audio module 102 may be a microphone, and the audio module 202 may be a speaker. The processor 103 may invoke a related instruction to control the audio module 101 and the audio module 202 to perform a distance measurement method in at least one embodiment, and can further obtain a real-time distance between the mobile phone 100 and the Tag device 200 based on an execution result of the audio module 101 and the audio module 202. For example, the processor 103 may be a processing chip integrated in the mobile phone 100. The memory 104 is configured to store a distance measurement-related instruction and data such as a plurality of groups of received sound wave signals. The display module 105 is configured to display a real-time distance obtained by the processor 103. For example, the display module 105 may be a display or a loudspeaker. A display manner of the real-time distance is not specifically limited in at least one embodiment.

In at least one embodiment, the mobile phone 100 includes a communication module 101, an audio module 102, a processor 103, a memory 104, and a display module 105. The Tag device 200 includes a communication module 201, an audio module 202, a processor 203, and a memory 204. The communication module 101, the audio module 102, the processor 103, the memory 104, the display module 105, the communication module 201, and the audio module 202 are the same as those in the foregoing embodiments, and details are not described herein again. The processor 203 is configured to obtain a sending moment corresponding to each group of sound wave signals through processing based on a related instruction, and the memory 204 is configured to store a distance measurement-related instruction and the sending moment corresponding to each group of sound wave signals. For example, the processor 203 may be a processing chip integrated in the Tag device 200.

In at least one embodiment, the mobile phone 100 includes a communication module 101, an audio module 102, and a display module 105. The Tag device 200 includes a communication module 201, an audio module 202, a processor 203, and a memory 204. The communication module 101, the audio module 102, the display module 105, the communication module 201, and the audio module 202 are the same as those in the foregoing embodiments, and details are not described herein again. The processor 203 is not only configured to obtain a sending moment corresponding to each group of sound wave signals through processing based on a related instruction, but also configured to obtain a real-time distance between the mobile phone 100 and the Tag device 200 through processing based on the related instruction. The memory 204 is configured to store an instruction related to distance measurement, the sending moment corresponding to each group of sound wave signals, and the real-time distance between the mobile phone 100 and the Tag device 200.

Figure 7:
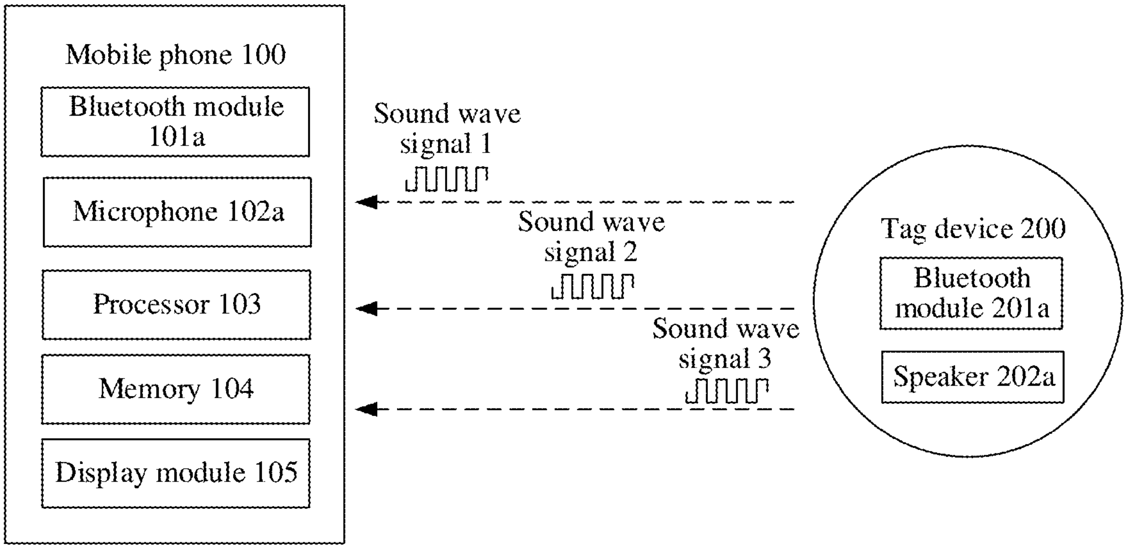
FIG. 7 is a diagram of a specific structure of a mobile phone 100 and a Tag device 200 according to at least one embodiment.

FIG. 7 is a diagram of a specific structure of a mobile phone 100 and a Tag device 200 according to at least one embodiment.

As shown in FIG. 7, the mobile phone 100 includes a Bluetooth module 101*a*, a microphone 102*a*, a processor 103, a memory 104, and a display module 105. The Tag device 200 includes a Bluetooth module 201*a* and a speaker 202*a*. The mobile phone 100 establishes a communication connection to the Tag device 200 by using the Bluetooth module 101*a* and the Bluetooth module 201*a*, to transmit data and an instruction between the mobile phone 100 and the Tag device 200. The Tag device 200 sends a sound wave signal through the speaker 202*a*, and the mobile phone 100 receives and collects the sound wave signal through the microphone 102*a*.

The sound wave signal sent by the speaker 202*a* and the sound wave signal received by the microphone 102*a* are not specifically limited in at least one embodiment, provided that a frequency band of the sound wave signal sent by the speaker 202*a* is within a frequency band range that can be received by the microphone 210*a*. For example, in at least one embodiment, the Tag device 200 may send an ultrasonic signal through the speaker 202*a*, and the mobile phone 100 can receive and collect the ultrasonic signal through the microphone 102*a*. In the measurement method, a mobile phone, a tablet computer, and a notebook computer are all equipped with a microphone and a speaker, and a Tag device is equipped with a speaker. A distance between any one of items such as the mobile phone, the tablet computer, and the notebook computer and the Tag device, and between any two of the mobile phone, the tablet computer, and the notebook computer can be measured by using an ultrasonic wave. In this case, a scope of at least one embodiment is expanded, hardware costs are reduced, and economic benefits are improved.

The following describes in detail a measurement solution of a measurement system provided in at least one embodiment.

Figure 8:
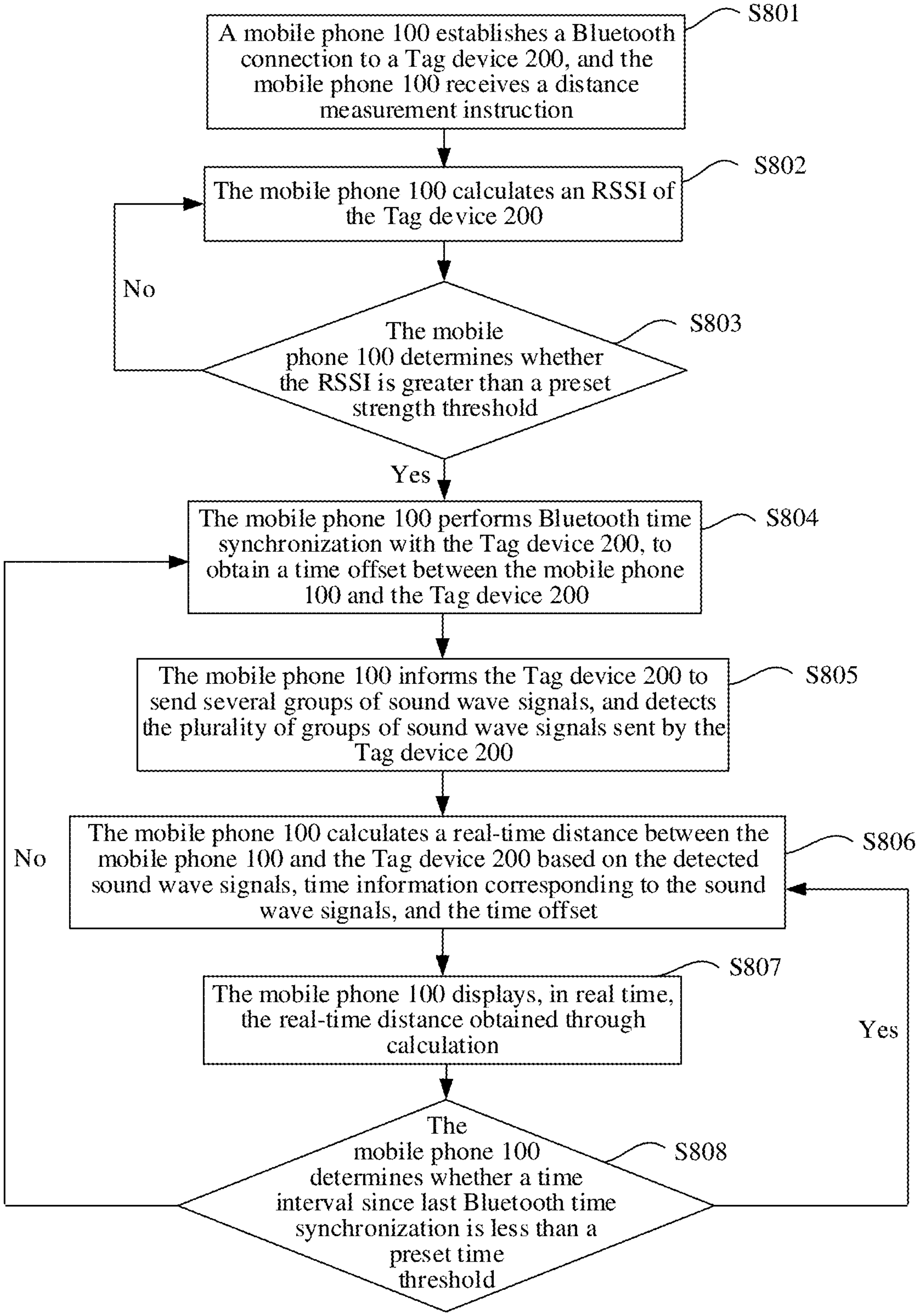
FIG. 8 is a flowchart of a distance measurement method according to at least one embodiment.

FIG. 8 is a flowchart of a distance measurement method according to at least one embodiment. The following describes the distance measurement method provided in at least one embodiment with reference to FIG. 8. Specifically, as shown in FIG. 8, the distance measurement method provided in at least one embodiment includes the following steps.

Step S801: A mobile phone 100 establishes a Bluetooth connection to a Tag device 200, and the mobile phone 100 receives a distance measurement instruction.

In at least one embodiment, in response to a user wanting to search for the Tag device 200 by using the mobile phone 100, the user may perform a search operation (for example, the foregoing related descriptions of the user operations in FIG. 3(*a*) and FIG. 3(*b*)) for the Tag device 200 on the mobile phone 100. The mobile phone 100 receives the distance measurement instruction generated based on the search operation. The distance measurement instruction refers to instruction information that is generated by the mobile phone 100 based on a user operation and that indicates the mobile phone 100 to interact with the Tag device 200, to obtain a real-time distance between the mobile phone 100 and the Tag device 200. In some implementations, the distance measurement instruction further carries identification information of the Tag device 200, so that interaction with the Tag device 200 can be accurately established in response to there being a plurality of associated electronic devices around the mobile phone 100.

In addition, the mobile phone 100 establishes the Bluetooth connection to the Tag device 200 based on the distance measurement instruction. Certainly, the mobile phone 100 may also implement a communication connection between the mobile phone 100 and the Tag device 200 in another manner, for example, establish a communication connection between the mobile phone 100 and the Tag device 200 in a manner such as a near-field (Nearby) module or near-field communication (NFC). However, because the user (that is, the mobile phone 100) does not know a specific location of the Tag device 200, only a wireless communication connection can be performed between the mobile phone 100 and the Tag device 200. Based on this, any manner in which the wireless communication connection between the mobile phone 100 and the Tag device 200 can be implemented falls within the protection scope of at least one embodiment. This is not specifically limited in at least one embodiment.

In at least one embodiment, the mobile phone 100 establishes a communication connection to the Tag device 200, and then the mobile phone 100 generates a distance measurement instruction based on a touch operation of the user. In at least one embodiment, the mobile phone 100 generates a distance measurement instruction based on a touch operation of the user, and a first electronic device establishes a communication connection to a second electronic device. In at least one embodiment, a first electronic device establishes a communication connection to a second electronic device, and the mobile phone 100 generates a distance measurement instruction based on a touch operation of the user at a same time. In other words, in at least one embodiment, a sequence in which the first electronic device establishes the communication connection to the second electronic device, and the mobile phone 100 receives the distance measurement instruction is not specifically limited in at least one embodiment.

Step S802: The mobile phone 100 calculates an RSSI of the Tag device 200.

In at least one embodiment, a Bluetooth module 101*a* in the mobile phone 100 calculates, based on a Bluetooth signal received from a Bluetooth module 201*a* in the Tag device 200, the RSSI corresponding to the Tag device 200. The RSSI refers to a received signal strength indication (RSSI) obtained based on the received Bluetooth signal. The RSSI represents strength of the Bluetooth signal that is sent by the Tag device 200 and received by the mobile phone 100, and may also be understood as an association between the mobile phone 100 and the Tag device 200 in a current state.

For example, a larger RSSI value indicates that the mobile phone 100 is closer to the Tag device 200, in other words, the association between the Tag device 200 and the mobile phone 100 is stronger, stability of the Bluetooth connection between the mobile phone 100 and the Tag device 200 is higher, and searching for the Tag device 200 is easier by using the mobile phone 100. A smaller RSSI value indicates that the mobile phone 100 is farther away from the Tag device 200, in other words, the association between the Tag device 200 and the mobile phone 100 may be weaker, and the user may not be able to search for the Tag device 200 by using the mobile phone 100.

Step S803: The mobile phone 100 determines whether the RSSI of the Tag device 200 is greater than a preset strength threshold.

In response to the RSSI of the Tag device 200 being greater than the preset strength threshold, the strength of the Bluetooth signal received by the Bluetooth module 101*a* is strong, in other words, the Bluetooth module 101*a* is close to the Bluetooth module 201*a*, which means that the mobile phone 100 is close to the Tag device 200. Therefore, to further determine a distance between the mobile phone 100 and the Tag device 200, and step S804 is performed. In response to the RSSI of the Tag device 200 not being greater than the preset strength threshold, the strength of the Bluetooth signal received by the Bluetooth module 101*a* is weak, in other words, the Bluetooth module 101*a* is far away from the Bluetooth module 201*a*, and even may cause inaccurate distance measurement. In this case, return to step S802.

In at least one embodiment, after obtaining the RSSI, the mobile phone 100 determines whether the RSSI is greater than the preset strength threshold. The preset strength threshold is an approximate value of the received signal strength indication that is determined based on association strength between the mobile phone 100 and the Tag device 200. The preset strength threshold is used to determine whether the mobile phone 100 is close to the Tag device 200.

Step S804: The mobile phone 100 performs Bluetooth time synchronization with the Tag device 200, to obtain a time offset between the mobile phone 100 and the Tag device 200.

The Bluetooth time synchronization refers to that the time offset between the mobile phone 100 and the Tag device 200 is determined by using the Bluetooth module 101*a* in the mobile phone 100 and the Bluetooth module 201*a* in the Tag device 200. The time offset refers to a deviation of time displayed on the mobile phone 100 and the Tag device 200. The mobile phone 100 and the Tag device 200 each have a clock, and therefore, time corresponding to the mobile phone 100 and time corresponding to the Tag device 200 can be separately obtained by statistics. However, in some cases, due to a setting error or a structural error, the time corresponding to the mobile phone 100 may be inconsistent with the time corresponding to the Tag device 200. To reduce a distance error in distance measurement calculation caused by such inconsistency, in at least one embodiment, the time offset between the mobile phone 100 and the Tag device 200 further is to be measured.

In at least one embodiment, the time offset may be $\Delta = T_T - T_P$, where $\Delta$ represents a time offset between the mobile phone 100 and the Tag device 200, a positive value represents that time corresponding to the Tag device 200 is earlier than time corresponding to the mobile phone 100, a negative value represents that time corresponding to the Tag device 200 is later than time corresponding to the mobile phone 100, $T_T$ represents time corresponding to the Tag device 200 at a predetermined moment, and $T_P$ represents time corresponding to the mobile phone 100 at the predetermined moment.

In addition, because a transmission speed of an electromagnetic wave is approximately $3\times10^8$ m/s, in response to the mobile phone 100 being close to the Tag device 200, transmission time is approximately 0. Based on this, in response to a group of electromagnetic waves being transmitted between the mobile phone 100 and the Tag device 200 for a single time, a sending moment and an arrival moment of the electromagnetic waves approximately represent the time offset between the mobile phone 100 and the Tag device 200. That is, $T_{P1} \approx T_{T1} - \Delta_1$, where $\Delta_1$ is a time offset corresponding to a first group, $T_{P1}$ represents a departure moment at which the electromagnetic waves depart from the mobile phone 100 or an arrival moment at which the electromagnetic waves arrive at the mobile phone 100, and $T_{T1}$ represents a departure moment at which the electromagnetic waves depart from the Tag device 200 or an arrival moment at which the electromagnetic waves arrive at the Tag device 200. Similarly, $T_{P1} \approx T_{T1} - \Delta_i$, where a value range of i is 1 to k, which is not specifically limited in at least one embodiment, $\Delta_i$ is a time offset corresponding to an $i^{th}$ group, $T_{Pi}$ represents a departure moment at which the electromagnetic waves depart from the mobile phone 100 or an arrival moment at which the electromagnetic waves arrive at the mobile phone 100, and $T_{Ti}$ represents a departure moment at which the electromagnetic waves depart from the Tag device 200 or an arrival moment at which the electromagnetic waves arrive at the Tag device 200.

Figure 9:
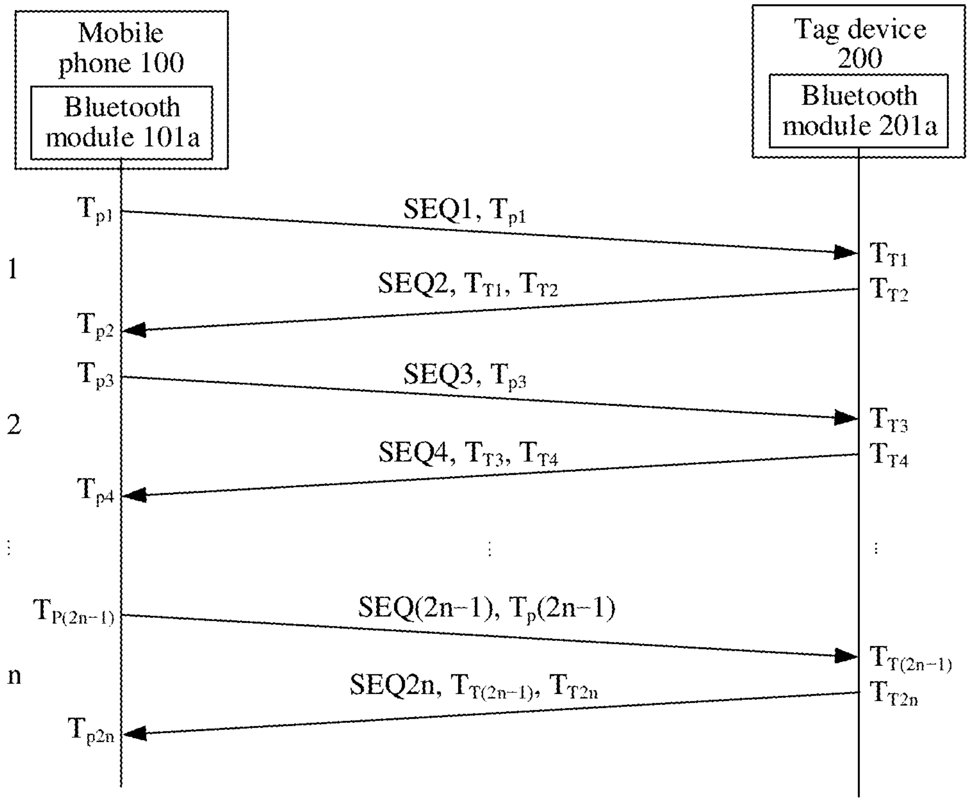
FIG. 9 is a diagram of Bluetooth time synchronization in a distance measurement method according to at least one embodiment.

The following describes a Bluetooth time synchronization manner in at least one embodiment in detail with reference to FIG. 9. Because a time offset Δ of each transmission cycle is affected by system scheduling, to reduce an error, a method of performing the time synchronization for a plurality of times and obtaining an average value may be used to reduce impact of the system scheduling on the time offset Δ. In at least one embodiment, the mobile phone 100 first sends a Bluetooth time synchronization signal SEQ1 to the Tag device 200 at a moment $T_{P1}$, and the Tag device 200 receives the Bluetooth time synchronization signal SEQ1 at a moment $T_{T1}$. $T_{P1}$ is time recorded by a local clock of the mobile phone 100, and $T_{T1}$ is time recorded by a local clock of the Tag device 200, that is, $\Delta_1 \approx T_{T1} - T_{P1}$, where $\Delta_1$ is a time offset obtained through first measurement. After receiving the Bluetooth time synchronization signal SEQ1, the Tag device 200 sends a Bluetooth time synchronization signal SEQ2 to the mobile phone 100 at a moment $T_{T2}$, and the mobile phone 100 receives the Bluetooth time synchronization signal SEQ2 at a moment $T_{P2}$. $T_{P2}$ is time recorded by the local clock of the mobile phone 100, and $T_{T2}$ is time recorded by the local clock of the Tag device 200, that is, $\Delta_2 \approx T_{T2} - T_{P2}$. By analogy, $T_{P2n}$ is time recorded by the local clock of the mobile phone 100, and $T_{T2n}$ is time recorded by the local clock of the Tag device 200, that is, $\Delta_{2n} \approx T_{T2n} - T_{P2n}$.

Based on this, after 2n times, an average value of time offsets is $$\Delta = \frac{1}{2n} \sum_{i=1}^{2n} \Delta_i .$$

After $\Delta_1$, $\Delta_2$, $\Delta_3$, . . . , $\Delta_{2n-1}$, and $\Delta_{2n}$ are respectively expanded, the following formula (1) is obtained:

$$\Delta = \frac{\sum_{i=1}^{n} [(T_{T(2i-1)} - T_{P(2i-1)}) + (T_{T2i} - T_{P2i})]}{2n} \tag{1}$$

After transformation, the following formula (2) is obtained:

$$\Delta = \frac{\sum_{i=1}^{n} [(T_{T(2i-1)} + T_{T2i}) - (T_{P(2i-1)} + T_{P2i})]}{2n} \tag{2}$$

After transformation, the following formula (3) is obtained:

$$\Delta = \frac{\sum_{i=1}^{n} (T_{T(2i-1)} + T_{T2i})}{2n} - \frac{\sum_{i=1}^{n} (T_{P(2i-1)} + T_{P2i})}{2n} \tag{3}$$

In some implementations, each time in response to sending the SEQ signal, the Tag device 200 may feed back, to the mobile phone 100, a receiving moment $T_{T(2i-1)}$ and a sending moment $T_{T2i}$ corresponding to the Bluetooth time synchronization signal whose receiving moment is $T_{T(2i-1)}$. After receiving data, the mobile phone 100 obtains the time offset Δ through calculation based on the formula (3).

In some other implementations, because a left part in the formula (3) (that is, the formula (4)) relates only to the receiving moment and the sending moment of the Tag device 200, an average value of the receiving moment and the sending moment may be first calculated by using the formula (4), and then the average value is fed back to the mobile phone 100 through Bluetooth for a single time.

$$\frac{\sum_{i=1}^{n} (T_{T(2i-1)} + T_{T2i})}{2n} \tag{4}$$

Step S805: The mobile phone 100 informs the Tag device 200 to send several groups of sound wave signals, and detects the plurality of groups of sound wave signals sent by the Tag device 200.

In at least one embodiment, the mobile phone 100 generates a sound emitting instruction informing the Tag device 200 to start to send the sound wave signals, and sends the sound emitting instruction to the Tag device 200. The Tag device 200 continuously sends the several groups of sound wave signals in response to the sound emitting instruction. The mobile phone 100 can continuously receive the plurality of groups of sound wave signals. The sound emitting instruction refers to instruction information that is sent by the mobile phone 100 to the Tag device 200 and indicates the Tag device 200 to start to send the sound wave signal. The sound emitting instruction may further include parameters such as a sending moment, a sending interval, or a sound wave wavelength (that is, a sound wave frequency band) of the sound wave signal sent by the Tag device 200, which are described in detail in the following, and the concept of the sound emitting instruction is not described in detail below.

In at least one embodiment, the Tag device 200 sends the sound wave signal in a use state, and the Tag device 200 does not send the sound wave signal in a natural state. In at least one embodiment, before the mobile phone 100 establishes the communication connection to the Tag device 200, and the mobile phone 100 receives the distance measurement instruction, the Tag device 200 further is to be bound to a related application of the mobile phone 100. Based on this, after the mobile phone 100 establishes the communication connection to the Tag device 200, and the mobile phone 100 receives the distance measurement instruction, the mobile phone 100 may send a sound wave signal sending request to the Tag device 200, so that the Tag device 200 sends sound wave signal, and a device other than the Tag device 200 does not send a sound wave signal. Based on this, the method can avoid that the mobile phone 100 receives the sound wave signal sent by a device other than the Tag device 200, reduce a processing difficulty of the mobile phone 100, improve processing efficiency of the mobile phone 100, improve a response speed of the mobile phone 100, and further improve user experience.

In at least one embodiment, the Tag device 200 sends the sound wave signal in a use state, and the Tag device 200 also sends the sound wave signal in a natural state. To be specific, in some other embodiments, the Tag device 200 always sends the sound wave signal, and the mobile phone 100 determines, based on the RSSI, whether the sound wave signal sent by the Tag device 200 is to be received. In response to the mobile phone 100 determining that the sound wave signal sent by the Tag device 200 is to be received, the mobile phone 100 starts to receive the sound wave signal sent by the Tag device 200. In response to the mobile phone 100 determining that the sound wave signal sent by the Tag device 200 is able to not be received, the mobile phone 100 does not receive the sound wave signal sent by the Tag device 200.

However, in at least one embodiment, in addition to the Tag device 200, other electronic devices are distributed around the mobile phone 100, and the other electronic devices may also send sound wave signals. In this case, the mobile phone 100 cannot identify, from the received sound wave signals, the sound wave signal sent by the Tag device 200. Based on this, in at least one embodiment, the sound wave signal sent by the Tag device 200 further carries a device identifier of the Tag device 200. The mobile phone 100 identifies, by using the device identifier of the Tag device 200, which sound wave signals are sound wave signals sent by the Tag device 200. In addition, in some other implementations of at least one embodiment, in response to the Tag device 200 sending time information to the mobile phone 100, the time information further carries a device identifier of the Tag device 200.

In at least one embodiment, the mobile phone 100 detects (that is, receives) a first group of sound wave signals at a first moment, and detects (that is, receives) a second group of sound wave signals at a second moment after the first moment. The first group of sound wave signals are a segment of sound wave signals, and the second group of sound wave signals are another segment of sound wave signals. The mobile phone 100 may continuously detect the first group of sound wave signals and the second group of sound wave signals, and then determine starting bands of the first group of sound wave signals and the second group of sound wave signals through correlation calculation, to separate the first group of sound wave signals and the second group of sound wave signals.

In at least one embodiment, the mobile phone 100 detects (that is, receives) a first group of sound wave signals at a first moment, detects (that is, receives) a third group of sound wave signals at a fifth moment, and detects (that is, receives) a second group of sound wave signals at a second moment after the first moment. The fifth moment is between the first moment and the second moment. Specifically, the mobile phone 100 determines, based on the first group of sound wave signals, the third group of sound wave signals, first information, and third information corresponding to the third group of sound wave signals, a first distance that is between the mobile phone 100 and the Tag device 200 and that corresponds to the first moment. The first electronic device determines, based on the second group of sound wave signals, the third group of sound wave signals, second information, and the third information, a second distance that is between the mobile phone 100 and the Tag device 200 and that corresponds to the second moment. For example, the mobile phone 100 successively receives six groups of sound wave signals sent by the Tag device 200: a sound wave signal 1, a sound wave signal 2, a sound wave signal 3, a sound wave signal 4, a sound wave signal 5, and a sound wave signal 6. Based on a moving speed of the mobile phone 100 and a distance between the mobile phone 100 and the Tag device 200, the distance between the mobile phone 100 and the Tag device 200 is determined to be displayed on the mobile phone 100 in response to the sound wave signal 1, the sound wave signal 4, and the sound wave signal 6 arriving at the mobile phone 100. Based on this, the mobile phone 100 may determine, based on the sound wave signal 1 (or further including the sound wave signal 2, or further including the sound wave signal 2 and the sound wave signal 3), the distance between the mobile phone 100 and the Tag device 200 in response to the sound wave signal 1 arriving at the mobile phone 100. The mobile phone 100 may determine, based on the sound wave signal 2, the sound wave signal 3, and the sound wave signal 4, the distance between the mobile phone 100 and the Tag device 200 in response to the sound wave signal 4 arriving at the mobile phone 100. Similarly, the mobile phone 100 may determine, based on the sound wave signal 5 and the sound wave signal 6, the distance between the mobile phone 100 and the Tag device 200 in response to the sound wave signal 6 arriving at the mobile phone 100. The foregoing are merely some examples, and this is not specifically limited in at least one embodiment.

The foregoing two types of embodiments are merely some examples of the sound wave signals received by the mobile phone 100. In at least one embodiment, the mobile phone 100 may receive, at any moment, sound wave signals sent by any group of Tag devices 200. This falls within the protection scope of at least one embodiment, and is not specifically limited in at least one embodiment.

Step S806: The mobile phone 100 calculates a real-time distance between the mobile phone 100 and the Tag device 200 based on the detected sound wave signals, information corresponding to the sound wave signals, and the time offset.

In at least one embodiment, the information corresponding to the sound wave signals includes sending time information of sending a group of sound wave signals in response to the Tag device 200 sending the group of sound wave signals. The sending time information is information that can represent a sending moment of the group of sound wave signals. For example, the sending time information may be a sending moment corresponding to the sound wave signal, or may be a sending interval corresponding to the sound wave signal. This is not specifically limited in at least one embodiment. The following describes a real-time distance calculation method by using the foregoing two types of sending time information.

Based on this, the mobile phone 100 may determine, based on the detected sound wave signals, a receiving moment at which each of the plurality of groups of sound wave signals are received in response to the group of sound wave signals arriving at the mobile phone 100. Then, the mobile phone 100 calculates, based on the sending moment of each group of sound wave signals, the receiving moment of each group of sound wave signals, and a sound wave velocity, a distance between the mobile phone 100 and the Tag device 200 in response to each group of sound wave signals being received.

In at least one embodiment, the mobile phone 100 detects (that is, receives) the first group of sound wave signals at the first moment, and detects (that is, receives) the second group of sound wave signals at the second moment after the first moment.

Figure 10A:
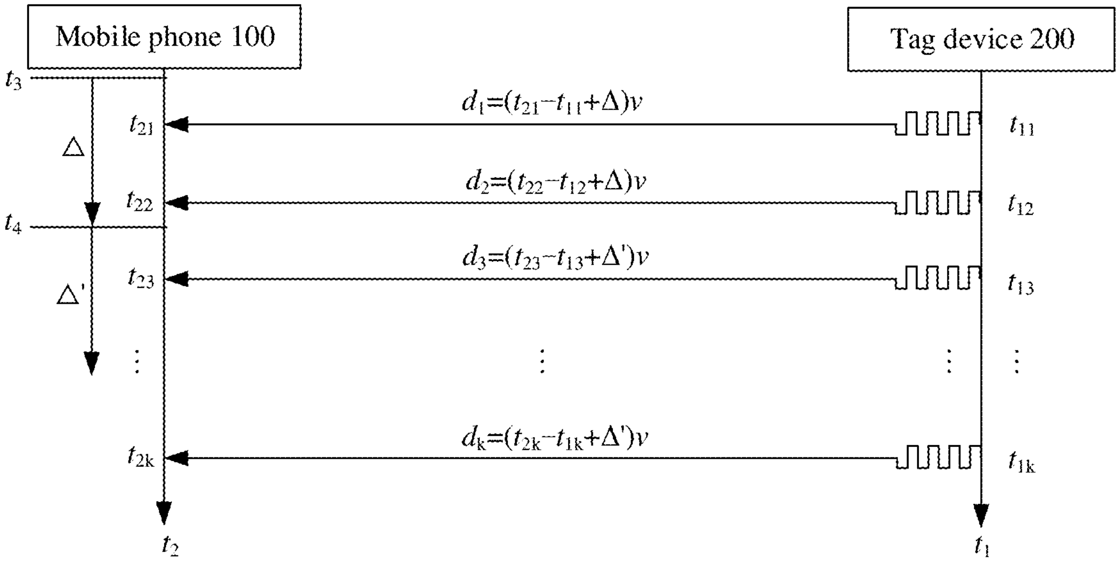
FIG. 10(*a*) is a diagram of a distance measurement method according to at least one embodiment, where first information includes a sending moment of a sound wave signal, and second information includes a sending moment of a second group of sound wave signals.
Figure 10B:
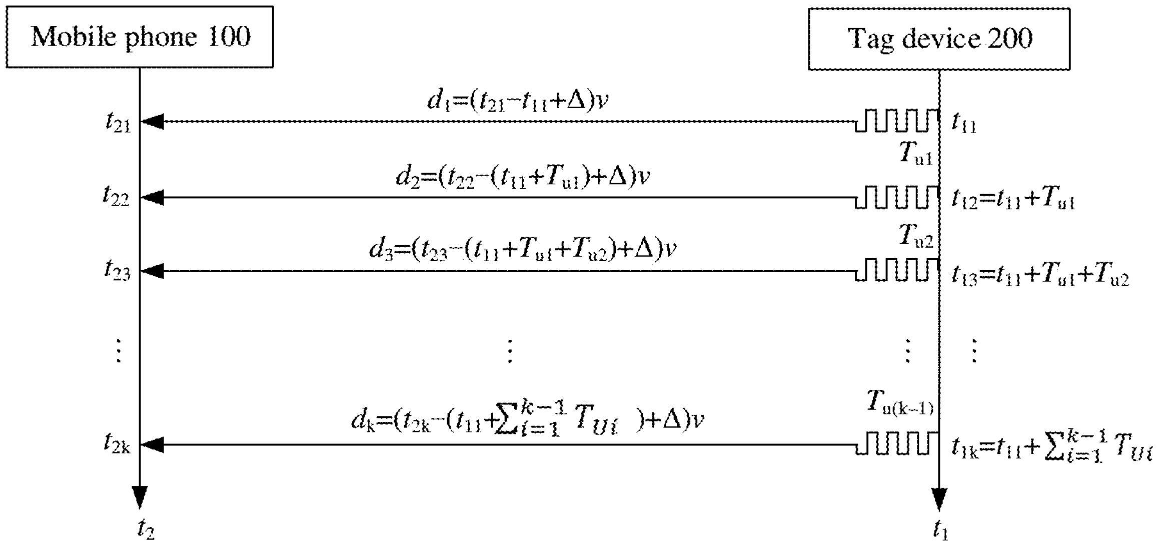
Figure 10C:
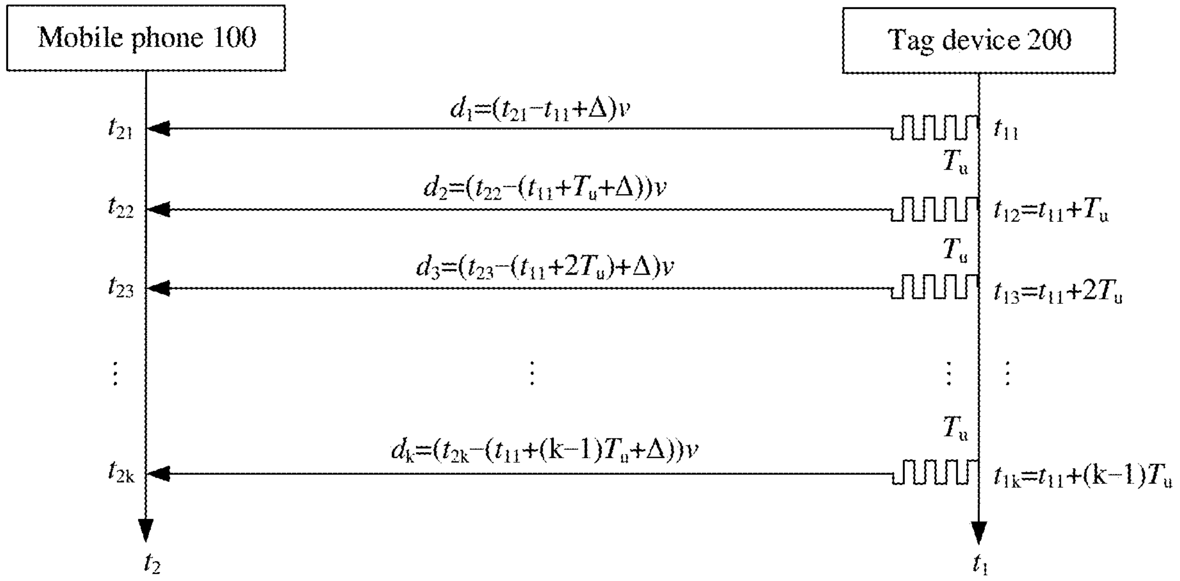

Specifically, as shown in FIG. 10(*a*). After detecting the first group of sound wave signals, the mobile phone 100 determines, based on the first group of sound wave signals, a receiving moment $t_{21}$ at which the first group of sound wave signals are received by the mobile phone 100. Then, the mobile phone 100 calculates, based on a sending moment $t_{11}$ at which the first group of sound wave signals are sent from the Tag device 200, the receiving moment $t_{21}$, a time offset Δ, and a sound wave velocity, a distance $d_1$ between the mobile phone 100 and the Tag device 200 at the moment $t_{21}$. In this case, the mobile phone 100 displays $d_1$ at the moment $t_{21}$ or after small duration from the moment $t_{21}$.

In at least one embodiment, the distance may be calculated based on a distance calculation formula. A principle of calculating the following distance is the same as a principle of calculating the distance $d_1$, and details are not described below. For example, the distance calculation formula is $d_k=(t_{2k}-t_{1k}+\Delta)v$, where $d_k$ represents a real-time distance, k represents a quantity of groups of sound wave signals, $t_{2k}$ represents an arrival moment at which a $k^{th}$ group of sound wave signals arrive at the mobile phone 100, and $t_{1k}$ represents a sending moment at which the $k^{th}$ group of sound wave signals start to be sent.

Similarly, still refer to FIG. 10(*a*). After detecting the second group of sound wave signals, the mobile phone 100 determines, based on the second group of sound wave signals, a receiving moment $t_{22}$ at which the second group of sound wave signals are received by the mobile phone 100. Then, the mobile phone 100 calculates, based on a sending moment $t_{12}$ at which the second group of sound wave signals are sent from the Tag device 200, the receiving moment $t_{22}$, a time offset Δ, and a sound wave velocity, a distance $d_2$ between the mobile phone 100 and the Tag device 200 at the moment $t_{22}$. In this case, the mobile phone 100 displays $d_2$ at the moment $t_{22}$ or after small duration from the moment $t_{22}$.

In at least one embodiment, as shown in FIG. 10(*b*), the sending moment $t_{12}$ at which the second group of sound wave signals are sent from the Tag device 200 may alternatively be represented as $t_{11}+T_{u1}$, where $T_{u1}$ represents a sending interval between sending the second group of sound wave signals by the Tag device 200 and sending the first sound wave signal by the Tag device 200. In this case, $d_2=(t_{22}-(t_{11}+T_{u1})+\Delta)v$. By analogy, $d_3=(t_{23}-(t_{11}+T_{u1}+T_{u2})+\Delta)v$.

That is, $d_k=(t_{2k}-(t_{11}+T_{u1}+\ldots+T_{u(k-1)})+\Delta)v$, where $d_k$ represents a real-time distance, $t_{2k}$ represents an arrival moment at which a $k^{th}$ group of sound wave signals arrive at the mobile phone 100, $t_{11}$ represents a sending moment at which the first group of sound wave signals start to be sent, k represents a quantity of groups of sound wave signals, $T_{u(k-1)}$ represents a sending interval between a $(k-1)^{th}$ group of sound wave signals and the $k^{th}$ group of sound wave signals, v represents a sound wave velocity, and a represents a time offset.

In at least one embodiment, as shown in FIG. 10(*c*), a sending interval between any two adjacent groups of sound wave signals is $T_u$. In this case, $d_k=(t_{2k}-(t_{11}+(k-1)T_u)+0)v$, where $d_k$ represents a real-time distance, $t_{2k}$ represents an arrival moment at which a $k^{th}$ group of sound wave signals arrive at the mobile phone 100, $t_{11}$ represents a sending moment at which the first group of sound wave signals start to be sent, k represents a quantity of groups of sound wave signals, $T_u$ represents a sending interval between two adjacent groups of sound wave signals, v represents a sound wave velocity, and Δ represents a time offset.

Step S807: The mobile phone 100 displays, in real time, the real-time distance obtained through calculation.

In at least one embodiment, after receiving the first group of sound wave signals, the mobile phone 100 calculates the first distance corresponding to the first group of sound wave signals, and displays the first distance in real time after calculating the first distance. Similarly, after receiving the second group of sound wave signals, the mobile phone 100 calculates the second distance corresponding to the second group of sound wave signals, and displays the second distance in real time after calculating the second distance. In at least one embodiment, the mobile phone 100 does not process the received first group of sound wave signals only after the mobile phone 100 receives the second group of sound wave signals. The two groups of sound wave signals may be in a proper delay relationship, but there is no sequence of transfer steps between the two groups of sound wave signals.

Step S808: The mobile phone 100 determines whether a time interval since last Bluetooth time synchronization is less than a preset time threshold. In response to the time interval since last Bluetooth time synchronization being less than the preset time threshold, return to step S806. In response to the time interval since last Bluetooth time synchronization not being less than the preset time threshold, return to step S804.

In at least one embodiment, each time after a preset time threshold Tb is reached, the mobile phone 100 and the Tag device 200 restart Bluetooth time synchronization. After the Bluetooth time synchronization ends, an updated time offset Δ' is obtained, and the real-time distance calculation formula is updated to $d_k=(t_{2k}-t_{1k}+\Delta')v$. Based on this, the mobile phone 100 and the Tag device 200 periodically perform Bluetooth time synchronization, so that time drift (that is, the time offset) between the mobile phone 100 and the Tag device 200 may be corrected. This ensures accuracy of distance measurement.

In at least one embodiment, as shown in FIG. 10(*a*), the mobile phone 100 performs Bluetooth time synchronization with the Tag device 200 at a third moment, to determine a first time offset Δ that is between the mobile phone 100 and the Tag device 200 and that corresponds to the third moment $t_3$. The mobile phone 100 determines, based on the first time offset Δ, the first group of sound wave signals, and the first information, a first distance after the third moment $t_3$. The mobile phone 100 determines, based on the first time offset Δ, the second group of sound wave signals, and the second information, a second distance after the third moment $t_3$.

In at least one embodiment, still refer to FIG. 10(*a*). The mobile phone 100 performs Bluetooth time synchronization with the Tag device 200 at a fourth moment after preset duration of the third moment, to determine a second time offset Δ' that is between the mobile phone 100 and the Tag device 200 and that corresponds to the fourth moment $t_4$. The mobile phone 100 determines, based on the second time offset Δ', the first group of sound wave signals, and the first information, a first distance after the fourth moment $t_4$. The mobile phone 100 determines, based on the second time offset Δ', the second group of sound wave signals, and the second information, a second distance after the fourth moment $t_4$.

In addition, the Tag device 200 is equipped with a temperature sensor. After each time synchronization, current temperature information is sent to the mobile phone 100 through Bluetooth. The mobile phone 100 calculates a sound velocity based on the current temperature information: v=331+0.607Temp, where Temp is the temperature information that is fed back by the Tag device 200 and whose unit is ° C.

In addition, in at least one embodiment, in response to the mobile phone 100 displaying at least two distances, and determines a third distance, the mobile phone 100 may determine a recommended movement direction of the mobile phone 100 based on the three distances and coordinates corresponding to the three distances determined by the mobile phone 100.

Figure 11A:
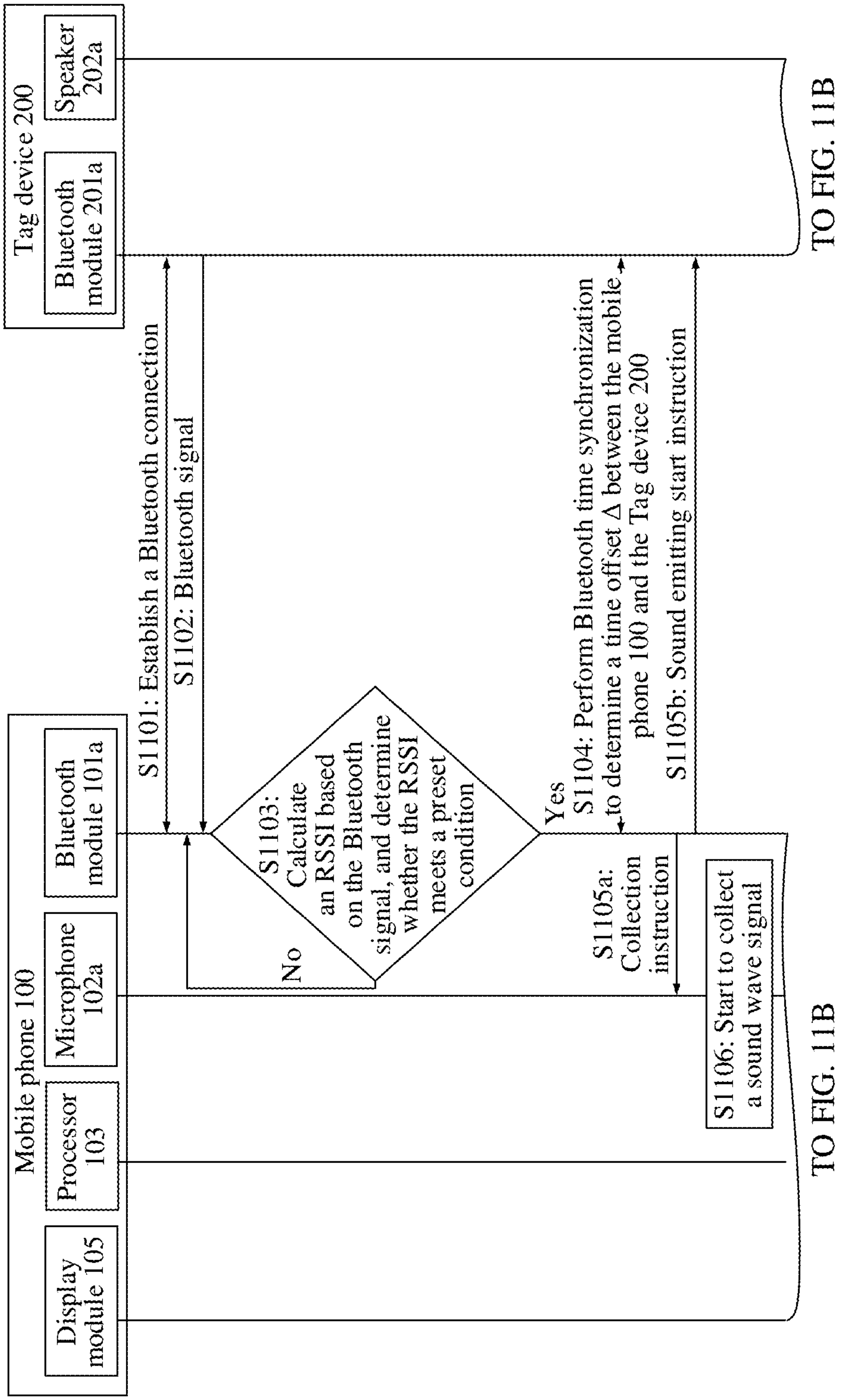
FIG. 11A and FIG. 11B are an interaction diagram corresponding to the distance measurement method in FIG. 8 according to at least one embodiment.
Figure 11B:
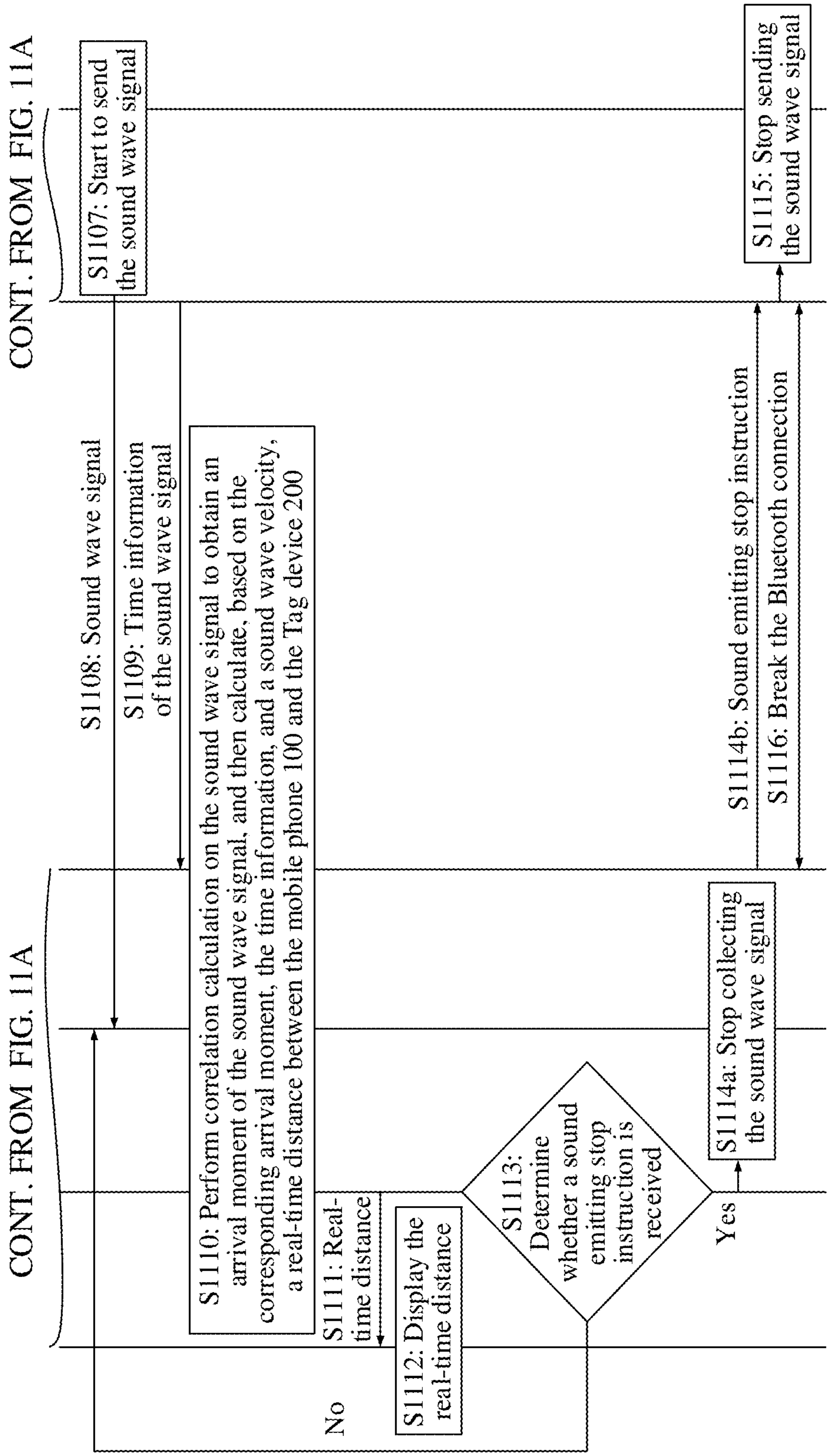

FIG. 11A and FIG. 11B are an interaction diagram corresponding to the distance measurement method in FIG. 8 according to at least one embodiment. The following describes in detail the distance measurement solution provided in at least one embodiment with reference to FIG. 8 and FIG. 11A and FIG. 11B. As shown in FIG. 11A and FIG. 11B, a mobile phone 100 includes a Bluetooth module 101*a*, a microphone 102*a*, a processor 103, and a display module 105. The Tag device 200 includes a Bluetooth module 201*a* and a speaker 202*a*. Specifically, the distance measurement method provided in at least one embodiment includes the following steps.

Step S1101: The Bluetooth module 101*a* establishes a Bluetooth connection to the Bluetooth module 201*a*.

In at least one embodiment, the Bluetooth module 101*a* in the mobile phone 100 establishes a wireless communication connection to the Bluetooth module 201*a* in the Tag device 200. However, a communication connection manner between the mobile phone 100 and the Tag device 200 is not specifically limited in at least one embodiment. In addition to the Bluetooth pairing connection, the communication connection manner in at least one embodiment may be another communication connection manner. This is not specifically limited in at least one embodiment.

Step S1102: The Bluetooth module 101*a* receives a Bluetooth signal sent by the Bluetooth module 201*a*.

In at least one embodiment, the Bluetooth signal refers to a broadcast packet that is sent by the Bluetooth module 201*a* and that carries parameters such as identification information of the Tag device 200 and signal strength. The Bluetooth module 101*a* in the mobile phone 100 can determine the identification information of the Tag device 200 and the signal strength of the Bluetooth signal based on the received Bluetooth signal.

In at least one embodiment, the Bluetooth module 101*a* receives a periodic Bluetooth signal sent by the Bluetooth module 201*a*. The periodic Bluetooth signal is a Bluetooth signal sent by the Bluetooth module 201*a* based on a predetermined periodicity. In at least one embodiment, the Bluetooth module 101*a* receives a predetermined quantity of Bluetooth signals sent by the Bluetooth module 201*a*. This is not specifically limited in at least one embodiment.

In at least one embodiment, a solution for sending the periodic Bluetooth signal received by the Bluetooth module 101*a* in the mobile phone 100 is not specifically limited in at least one embodiment, and only a Bluetooth signal received by the Bluetooth module 201*a* in the Tag device 200 is to be limited in at least one embodiment. Specifically, in at least one embodiment, the Bluetooth module 201*a* in the Tag device 200 always sends a periodic Bluetooth signal to the outside. After the Bluetooth module 101*a* establishes the communication connection to the Bluetooth module 201*a*, the Bluetooth module 101*a* starts to receive the periodic Bluetooth signal sent by the Bluetooth module 201*a*. In at least one embodiment, after the mobile phone 100 establishes the communication connection to the Tag device 200 by using the Bluetooth module 101*a* and the Bluetooth module 201*a*, the Bluetooth module 201*a* in the Tag device 200 starts to send a periodic Bluetooth signal to the outside.

Step S1103: The Bluetooth module 101*a* calculates an RSSI based on the received Bluetooth signal, and determines whether the RSSI obtained through calculation is greater than a preset strength threshold. In response to the RSSI obtained through calculation being greater than the preset strength threshold, go to step S1104. In response to the RSSI obtained through calculation not being greater than the preset strength threshold, return to step S1102. These steps are the same as steps S802 and S803, and details are not described herein again.

Step S1104: The Bluetooth module 101*a* performs Bluetooth time synchronization with the Bluetooth module 201*a*, to determine a time offset Δ between the mobile phone 100 and the Tag device 200.

The time offset Δ between the mobile phone 100 and the Tag device 200 represents a difference between a clock display of the mobile phone 100 and a clock display of the Tag device 200, and is irrelevant to real time. For example, in response to a clock of the mobile phone 100 showing 10:01:02, and a clock of the Tag device 200 shows 10:01:03, the time offset Δ between the mobile phone 100 and the Tag device 200 is 0.01 s. For another example, in response to a clock of the mobile phone 100 showing 10:01:03, and a clock of the Tag device 200 shows 10:01:02, the time offset Δ between the mobile phone 100 and the Tag device 200 is −0.01 s.

Step S1105*a*: The Bluetooth module 101*a* sends a collection instruction to the microphone 102*a*.

The collection instruction is indication information that is generated by the mobile phone 100 in response to the Bluetooth module 101*a* determining that the RSSI is greater than the preset strength threshold and that indicates the microphone 102*a* to start to collect a sound wave signal.

The technical solution of switching from step S1104 to step S1106 is an example of the technical solution in at least one embodiment. This is not specifically limited in at least one embodiment. For example, in at least one embodiment, step S1107 may be performed after step S1104 is performed, and then step S1106 is performed. For another example, in at least one embodiment, steps S1106 and S1107 may be performed at a same time after step S1104 is performed.

Step S1105*b*: The Bluetooth module 101*a* sends a sound emitting start instruction to the Bluetooth module 201*a*.

Step S1106: In response to the sound emitting start instruction, the microphone 102*a* starts to collect the sound wave signal.

Step S1107: The speaker 202*a* starts to send the sound wave signal in response to the sound emitting start instruction.

In at least one embodiment, after the mobile phone 100 determines that the mobile phone 100 establishes the communication connection to the Tag device 200, the Bluetooth module 101*a* sends the sound emitting start instruction to the Bluetooth module 201*a*, and the speaker 202*a* in the Tag device 200 starts to send several groups of sound wave signals. The speaker 220 in the Tag device 200 may periodically send the several groups of sound wave signals.

In at least one embodiment, after the mobile phone 100 determines that the mobile phone 100 establishes the communication connection to the Tag device 200, the Bluetooth module 101*a* sends the sound emitting start instruction to the Bluetooth module 201*a*, where the sound emitting start instruction carries a preset sending moment, and the speaker 202*a* in the Tag device 200 starts to send the several groups of sound wave signals based on the preset sending moment. The speaker 220 in the Tag device 200 may periodically send the several groups of sound wave signals. In at least one embodiment, a quantity of groups of sound wave signals is a predetermined value.

In at least one embodiment, after the mobile phone 100 determines that the mobile phone 100 establishes the communication connection to the Tag device 200, the Bluetooth module 101*a* sends the sound emitting start instruction to the Bluetooth module 201*a*, where the sound emitting start instruction carries a preset frequency band of the sound wave signal, and the speaker 202*a* in the Tag device 200 sends the sound wave signal of the preset frequency band based on the sound emitting start instruction.

Step S1108: The microphone 102*a* collects the sound wave signal sent by the speaker 202*a*.

In at least one embodiment, sound wave signals sent by the Tag device 200 are several groups of sound wave signals, and the microphone 102*a* in the mobile phone 100 can receive the plurality of groups of sound wave signals sent by the speaker 202*a* in the Tag device 200. The sound wave signal may be an ultrasonic signal whose frequency is higher than 20 kHz, or may be a sound wave signal in another frequency band. This is not specifically limited in at least one embodiment. The plurality of groups of sound wave signals refer to a plurality of segments of sound wave signals that are respectively sent at intervals based on a specific sending manner.

In at least one embodiment, a frequency range of the sound wave signals is 20 Hz to $2*10^4$ Hz. In at least one embodiment, a frequency range of the sound wave signals is $2*10^4$ Hz to $1*10^{12}$ Hz. In at least one embodiment, a frequency range of the sound wave signals is 20 Hz to $1*10^{12}$ Hz. For example, the frequency range of the sound wave signals is $1.8*10^4$ Hz to $2.2*10^4$ Hz.

Step S1109: The Bluetooth module 101*a* receives time information of the sound wave signal from the Bluetooth module 201*a*.

In at least one embodiment, the time information is sending time information of the sound wave signal sent by the speaker 201*a*. The time information may include a sending moment or a sending interval. A sending moment $t_1$ of each group of sound wave signals may be directly represented by a start sending moment of each group of sound wave signals, or may be represented by a sending moment $t_1$ of a first group of sound wave signals and a sending interval $T_u$ between two adjacent groups of sound wave signals. A time difference between sending moments of the two adjacent groups of sound wave signals is the sending interval. This is not specifically limited in at least one embodiment. In some implementations, sending intervals between the plurality of groups of sound wave signals may be fixed or changeable. For example, the sending interval is gradually shortened, or the sending interval is gradually prolonged.

In at least one embodiment, the sending moment of each group of sound wave signals is fed back by using the Bluetooth module 101*a* and the Bluetooth module 201*a*, so that a transmission delay and a bit error rate may be reduced. This improves accuracy of distance measurement.

Then, in some implementations, the Tag device 200 determines a sending interval between two adjacent groups of sound wave signals, and sends the sound wave signals based on the determined sending interval. In addition, the Tag device 200 further sends the determined sending interval to the mobile phone 100, so that the mobile phone 100 can calculate, based on the sending moment of the first group of sound wave signals and the sending interval, a sending moment of each subsequent group of sound wave signals. Alternatively, the Tag device 200 calculates the sending moment of each group of sound wave signals based on the determined sending interval and the first group of sound wave signals, and then sends the calculated sending moment of each group of sound wave signals to the mobile phone 100. Alternatively, in response to the sending interval between sending moments of the two adjacent groups of sound wave signals changing according to a preset change rule, the Tag device 200 may send the change rule to the mobile phone 100, or the Tag device 200 calculates the sending moment of each group of sound wave signals according to the change rule, and then sends the sending moment of each group of sound wave signals to the mobile phone 100.

Specifically, in some implementations, the Tag device 200 determines the sending moment of each group of sound wave signals, and sends the sending moment of each group of sound wave signals to the mobile phone 100 at a same time. In some other implementations, the mobile phone 100 determines the sending moment of each group of sound wave signals, and generates a start sending instruction of each group of sound wave signals based on the sending moment of each group of sound wave signals. After receiving the start sending instruction, the Tag device 200 sends the sound wave signals to the outside based on the instruction.

In addition, there are various implementations in which the mobile phone 100 receives the plurality of groups of sound wave signals sent by the Tag device 200. The following briefly describes several implementation solutions. Specifically, in some implementations, the audio module 102 in the mobile phone 100 is always in an enabled state. After the mobile phone 100 establishes the communication connection to the Tag device 200, the audio module 202 in the Tag device 200 sends the plurality of groups of sound wave signals to the outside, so that the audio module 102 can receive the plurality of groups of sound wave signals sent by the audio module 202. In some other implementations, the Tag device 200 always sends the plurality of groups of sound wave signals to the outside. After the communication module 101 in the mobile phone 100 establishes a communication connection to the communication module 201 in the Tag device 200, the audio module 102 in the mobile phone 100 is started, to receive the plurality of groups of sound wave signals sent by the Tag device 200 to the outside. In some other implementations, after the mobile phone 100 establishes the communication connection to the Tag device 200, the audio module 102 in the mobile phone 100 is started, and the audio module 202 in the Tag device 200 sends the plurality of groups of sound wave signals to the outside, so that the audio module 102 can receive the plurality of groups of sound wave signals sent by the audio module 202.

Step S1110: In response to the microphone 102*a*, the processor 103 performs correlation calculation on the sound wave signal to obtain an arrival moment of the sound wave signal, and then calculates, based on the corresponding arrival moment, the time information, and a sound wave velocity, a real-time distance between the mobile phone 100 and the Tag device 200. The time information may include a sending moment and a sending interval, and the time information may further include a sending moment of each group of sound wave signals, and the arrival moment is a receiving moment at which the sound wave signals are received by the mobile phone 100.

In at least one embodiment, the processor 103 in the mobile phone 100 performs correlation calculation on the plurality of groups of received sound wave signals, determines, based on correlation between the plurality of groups of sound wave signals and a template sound wave signal, start locations of the plurality of groups of sound wave signals, and further determines an arrival moment $t_2$ of each of the plurality of groups of sound wave signals. Then, the processor 103 in the mobile phone 100 obtains, through a bus, a sending moment $t_1$ of each group of sound wave signals obtained by the Bluetooth module 101*a*. Then, the processor 103 calculates, based on a formula, a real-time distance $d_k$ between the mobile phone 100 and the Tag device 200 based on the sending moment $t_1$, the arrival moment $t_2$, and a sound wave velocity v.

Step S1111: The display module 105 receives the real-time distance from the processor 103, and then step S1112 is performed.

Step S1112: The display module 105 displays the real-time distance on a display interface.

In at least one embodiment, in response to the real-time distance being within a preset range, the display module 105 in the mobile phone 100 displays the real-time distance. In response to the real-time distance being greater than a preset range, the mobile phone 100 is far away from the Tag device, and the display module 105 in the mobile phone 100 does not display the distance. In response to the real-time distance being less than a preset range, a prompt is displayed, indicating that the Tag device 200 is nearby. For example, the preset range is 1 m to 20 m, or the preset range is 1 m to 10 m.

Step S1113: The processor 130 determines whether a sound emitting stop instruction is received, where the sound emitting stop instruction may be an operation instruction that is generated based on a touch operation of a user and that indicates to stop searching. In response to the sound emitting stop instruction being received, go to step S1114*a* and step S1114*b*. In response to the sound emitting stop instruction not being received, return to step S1108.

Step S1114*a*: The microphone 102*a* stops collecting the sound wave signal.

Step S1114*b*: The Bluetooth module 101*a* sends the sound emitting stop instruction to the Bluetooth module 201*a*, and then step S1115 is performed.

Step S1115: The speaker 202*a* stops sending the sound wave signal in response to the sound emitting stop instruction received by the Bluetooth module 201*a*.

Step S1116: The Bluetooth module 101*a* breaks the Bluetooth connection to the Bluetooth module 201*a*.

Figure 12:
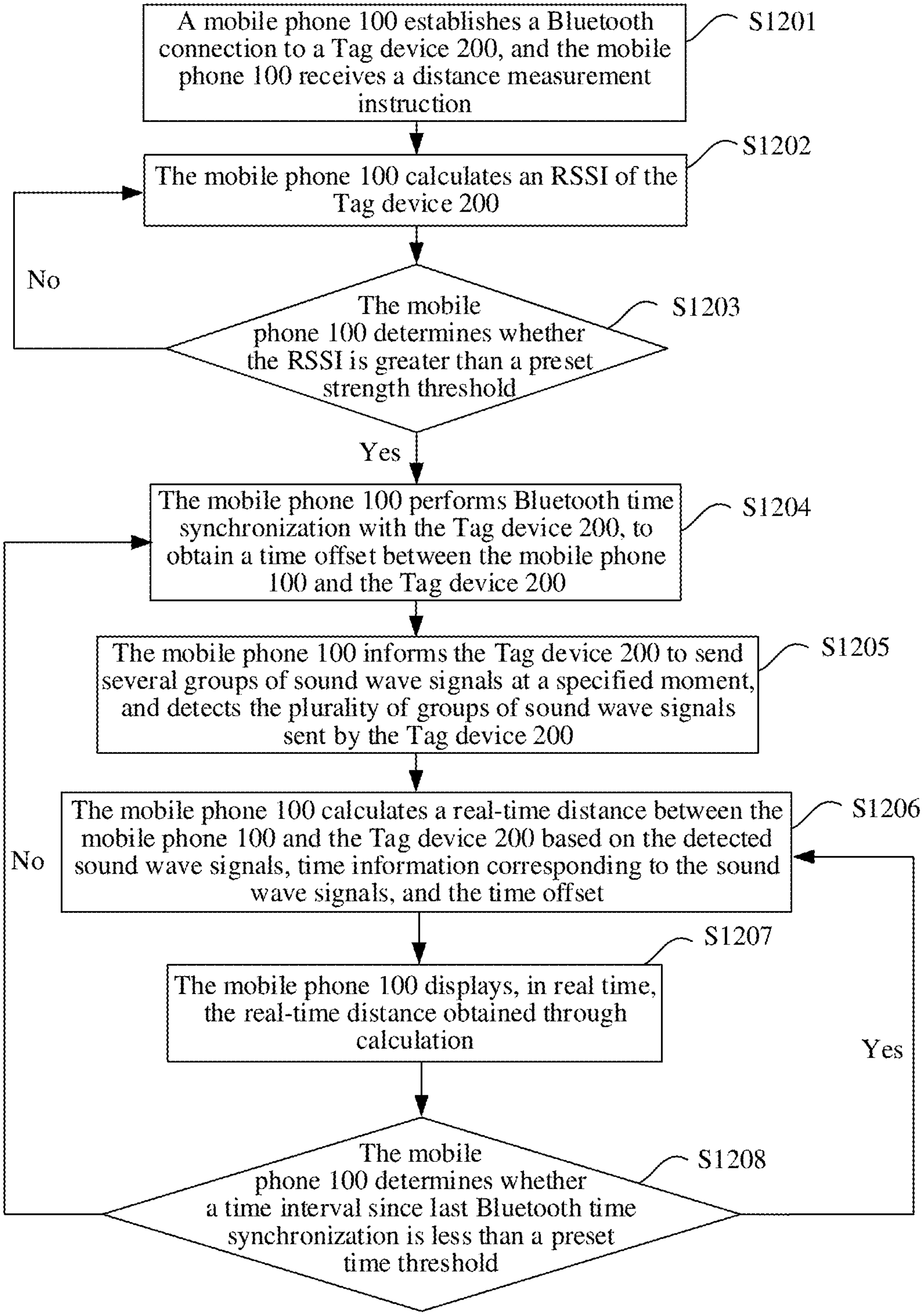
FIG. 12 is a flowchart of a distance measurement method according to at least one embodiment.

At least one embodiment further provides some other embodiments. FIG. 12 is a flowchart of a distance measurement method according to at least one embodiment. The following describes the distance measurement method provided in at least one embodiment with reference to FIG. 12. Specifically, as shown in FIG. 12, the distance measurement method provided in at least one embodiment includes the following steps.

Step S1201: A mobile phone 100 establishes a Bluetooth connection to a Tag device 200, and the mobile phone 100 receives a distance measurement instruction. Step S1201 is the same as step S801, and details are not described herein again.

Step S1202: The mobile phone 100 calculates an RSSI of the Tag device 200. Step S1202 is the same as step S802, and details are not described herein again.

Step S1203: The mobile phone 100 determines whether the RSSI is greater than a preset strength threshold. In response to the RSSI being greater than the preset strength threshold, go to step S1204. In response to the RSSI not being greater than the preset strength threshold, return to step S1202. Step S1203 is the same as step S803, and details are not described herein again.

Step S1204: The mobile phone 100 performs Bluetooth time synchronization with the Tag device 200, to obtain a time offset between the mobile phone 100 and the Tag device 200. Step S1204 is the same as step S804, and details are not described herein again.

Step S1205: The mobile phone 100 informs the Tag device 200 to send several groups of sound wave signals at a specified moment, and receives the plurality of groups of sound wave signals sent by the Tag device 200.

Step S1206: The mobile phone 100 calculates a real-time distance between the mobile phone 100 and the Tag device 200 based on the detected sound wave signals, time information corresponding to the sound wave signals, and the time offset. The time information may be a specified moment. Step S1206 is the same as step S806, and details are not described herein again.

Step S1207: The mobile phone 100 displays, in real time, the real-time distance obtained through calculation. Step S1207 is the same as step S807, and details are not described herein again.

Step S1208: The mobile phone 100 determines whether a time interval since last Bluetooth time synchronization is less than a preset time threshold. In response to the time interval since last Bluetooth time synchronization being less than the preset time threshold, return to step S1206. In response to the time interval since last Bluetooth time synchronization not being less than the preset time threshold, return to step S1204. Step S1208 is the same as step S808, and details are not described herein again.

In the foregoing distance measurement method, the mobile phone 100 is able to not feed back sending time information of each group of sound wave signals through Bluetooth, so that interaction between the mobile phone 100 and the Tag device 200 is reduced, and timeliness and accuracy of the distance measurement method are improved. In addition, the mobile phone 100 may further properly adjust sending time information corresponding to a subsequent group of sound wave signals based on the distance between the mobile phone 100 and the Tag device 200 that has been determined by the mobile phone 100.

In at least one embodiment, in response to a first distance value determined by the mobile phone 100 being small, the mobile phone 100 is close to the Tag device 200, and a user is about to find the Tag device 200. In this case, a sending time interval between a first group of sound wave signals and a second group of sound wave signals may be shortened, in other words, a difference between first time and second time may be reduced, to improve display precision of a distance between the mobile phone 100 and the Tag device 200, so that in response to the mobile phone 100 moving slightly, the mobile phone 100 can also accurately capture a distance difference between the mobile phone 100 and the Tag device 200.

In at least one embodiment, in response to a first distance value determined by the mobile phone 100 being small, the mobile phone 100 is close to the Tag device 200, and a user is about to find the Tag device 200. In this case, a relative movement speed between the mobile phone 100 and the Tag device 200 may be slowed down, to improve display precision of a distance between the mobile phone 100 and the Tag device 200, so that in response to the mobile phone 100 moving slightly, the mobile phone 100 can also accurately capture a distance difference between the mobile phone 100 and the Tag device 200.

In addition, in at least one embodiment, in the distance measurement method, first information corresponding to a first group of sound wave signals is determined by the mobile phone 100, and second information corresponding to a second group of sound wave signals is determined by the Tag device 200. The mobile phone 100 sends the first information to the Tag device 200, and the Tag device 200 sends the second information to the mobile phone 100. Alternatively, second information is determined by the mobile phone 100, and first information is determined by the Tag device 200. The mobile phone 100 sends the second information to the Tag device 200, and the Tag device 200 sends the first information to the mobile phone 100.

In addition, in at least one embodiment, in the distance measurement method, first information and second information is determined by a third electronic device, and the mobile phone 100 and the Tag device 200 obtain the first information and the second information.

Any combination of the foregoing implementations falls within the protection scope of at least one embodiment. This is not specifically limited in at least one embodiment.

Figure 13A:
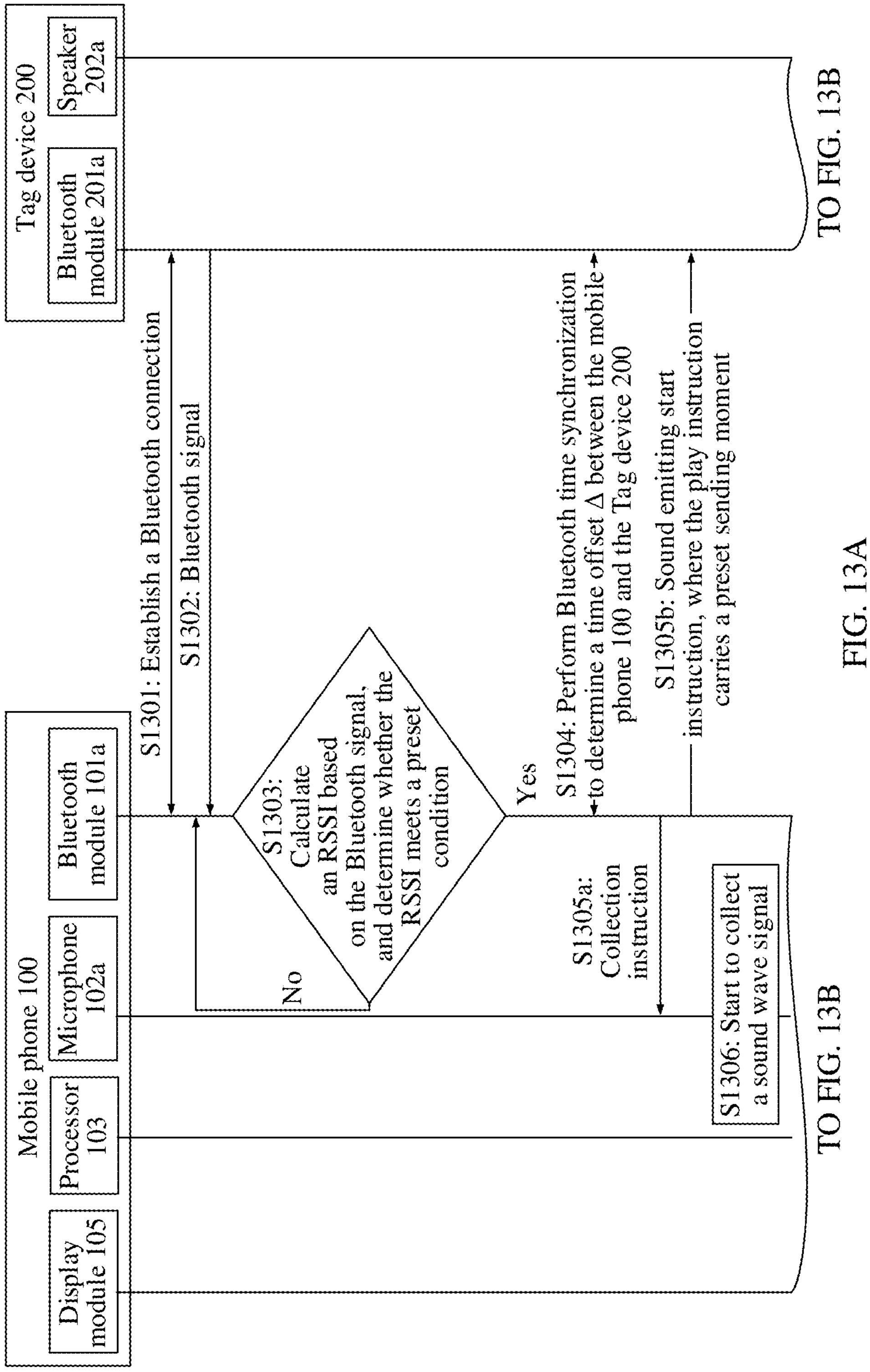
FIG. 13A and FIG. 13B are an interaction diagram corresponding to the distance measurement method in FIG. 12 according to at least one embodiment.
Figure 13B:
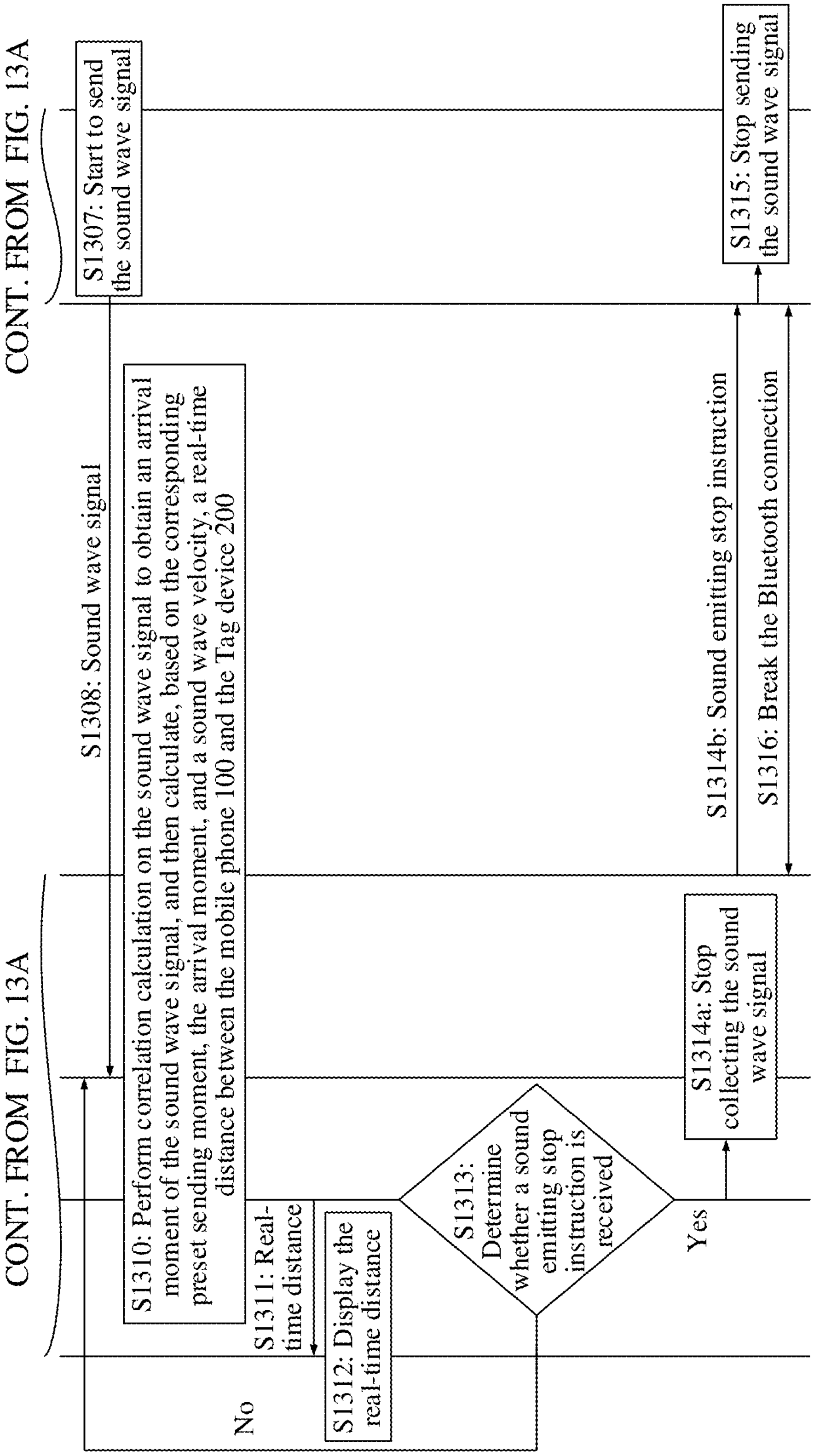

FIG. 13A and FIG. 13B are an interaction diagram corresponding to the distance measurement method in FIG. 12 according to at least one embodiment. The following describes in detail the distance measurement method provided in at least one embodiment with reference to FIG. 13A and FIG. 13B. Specifically, as shown in FIG. 13A and FIG. 13B, the distance measurement method provided in at least one embodiment includes the following steps.

Step S1301 to step S1305*a*, step S1306, and step S1308 are the same as step S1101 to step S1105*a*, step S1106, and step S1108, and details are not described herein again.

Step S1305*b*: Sound emitting start instruction, where the sound emitting instruction carries a preset sending moment.

Step S1308: A microphone 102*a* collects a sound wave signal sent by a speaker 202*a* at the preset sending moment.

Step S1310 to step S1316 are basically the same as step S1110 to step S1116, and details are not described herein again.

In conclusion, step S1305*b* is different from step S1105*b*. In addition, a step of a Bluetooth module 101*a* receiving a sending moment of each group of sound wave signals from a Bluetooth module 201*a* is canceled. This reduces interaction between the mobile phone 100 and the Tag device 200, improves calculation efficiency, and can also avoid false transmission, so that accuracy of a real-time distance is improved.

Figure 14:
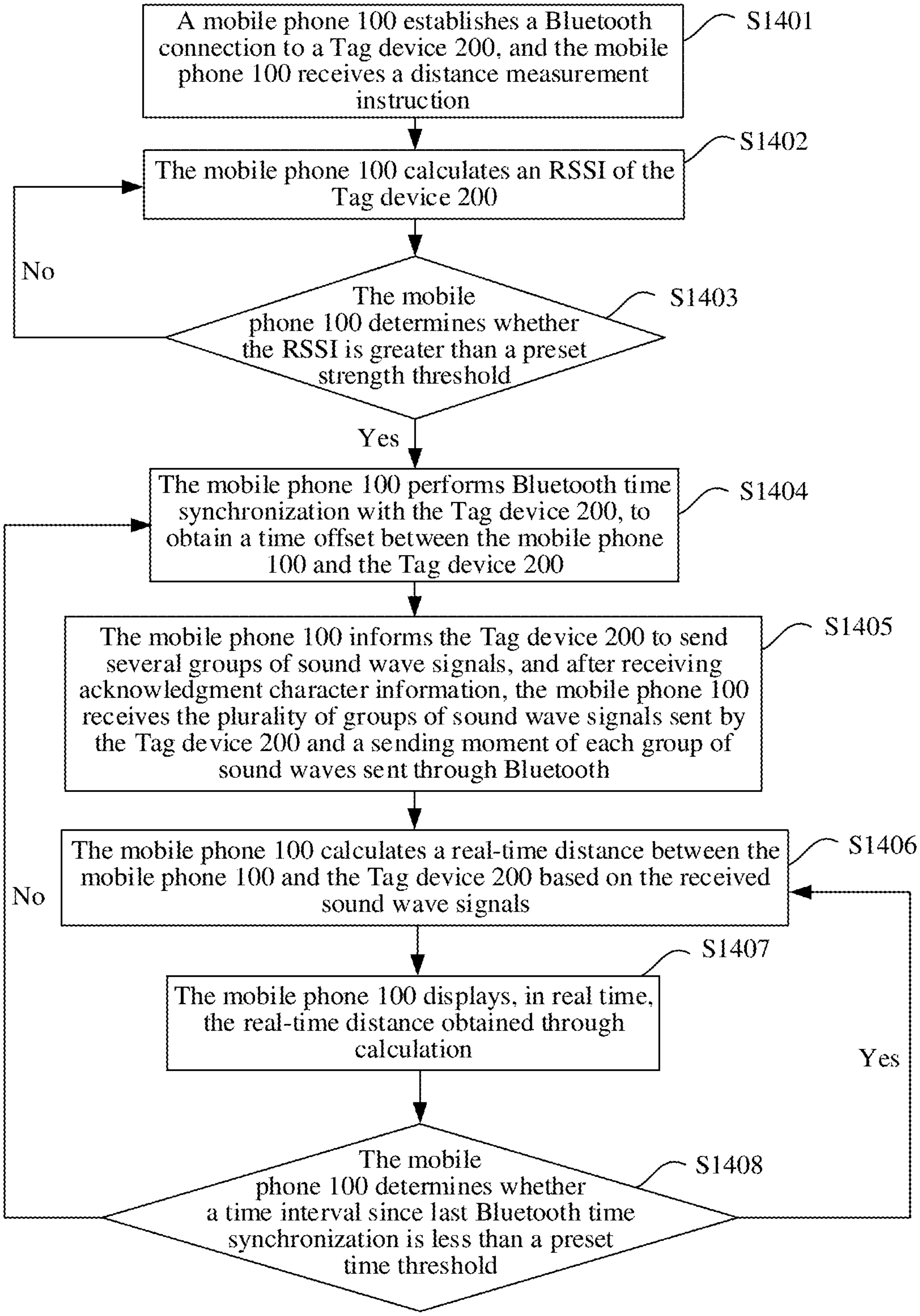
FIG. 14 is a flowchart of a distance measurement method according to at least one embodiment.

FIG. 14 is a flowchart of a distance measurement method according to at least one embodiment. The following describes the distance measurement method provided in at least one embodiment with reference to FIG. 14. Specifically, as shown in FIG. 14, the distance measurement method provided in at least one embodiment includes the following steps.

Step S1401: A mobile phone 100 establishes a Bluetooth connection to a Tag device 200, and the mobile phone 100 receives a distance measurement instruction. Step S1401 is the same as step S801, and details are not described herein again.

Step S1402: The mobile phone 100 calculates an RSSI of the Tag device 200. Step S1402 is the same as step S802, and details are not described herein again.

Step S1403: The mobile phone 100 determines whether the RSSI is greater than a preset strength threshold. In response to the RSSI being greater than the preset strength threshold, go to step S1404. In response to the RSSI not being greater than the preset strength threshold, return to step S1402. Step S1403 is the same as step S803, and details are not described herein again.

Step S1404: The mobile phone 100 performs Bluetooth time synchronization with the Tag device 200. Step S1404 is the same as step S804, and details are not described herein again.

Step S1405: The mobile phone 100 informs the Tag device 200 to send several groups of sound wave signals, and after receiving acknowledgment character information, the mobile phone 100 receives the plurality of groups of sound wave signals sent by the Tag device 200 and a sending moment of each group of sound wave signals sent through Bluetooth.

After the Bluetooth time synchronization is completed, the mobile phone 100 is to inform the Tag device 200 to send the sound wave signals each time. After receiving the notification, the Tag device 200 sends the acknowledgment (ACK) character information to the mobile phone 100 through the Bluetooth, then sends the sound wave signals, and notifies the mobile phone 100 of a moment at which the Tag device 200 sends the sound wave signals through the Bluetooth.

Step S1406: The mobile phone 100 calculates a real-time distance between the mobile phone 100 and the Tag device 200 based on the received sound wave signal. The mobile phone 100 determines the real-time distance between the mobile phone 100 and the Tag device 200 based on the received sound wave signal, time information, and a sound wave velocity. Step S1406 is basically the same as step S806, and details are not described herein again.

Step S1407: The mobile phone 100 displays, in real time, the real-time distance obtained through calculation. Step S1407 is the same as step S807, and details are not described herein again.

Step S1408: The mobile phone 100 determines whether a time interval since last Bluetooth time synchronization is less than a preset time threshold. In response to the time interval since last Bluetooth time synchronization being less than the preset time threshold, return to step S1406. In response to the time interval since last Bluetooth time synchronization not being less than the preset time threshold, return to step S1404. Step S1408 is the same as step S808, and details are not described herein again.

In the foregoing distance measurement method, after the Bluetooth time synchronization, the mobile phone 100 directly notifies the Tag device 200 of a start time at which the mobile phone 100 starts to send an ultrasonic signal. In this way, the Tag device 200 does not feed back a sending time of the Tag device 200 through the Bluetooth. This reduces interaction between the mobile phone 100 and the Tag device 200.

Figure 15A:
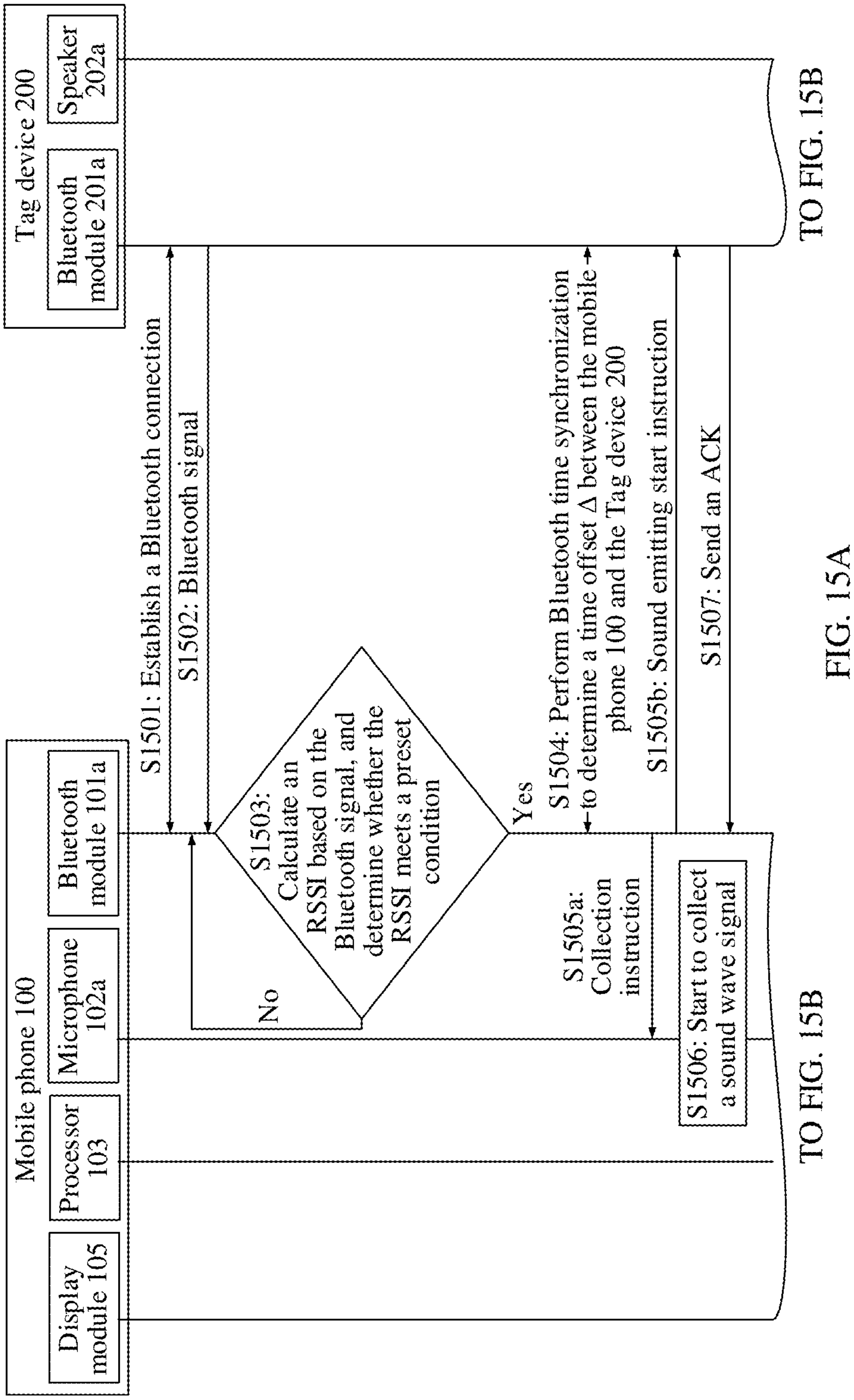
FIG. 15A and FIG. 15B are an interaction diagram corresponding to the distance measurement method in FIG. 14 according to at least one embodiment.
Figure 15B:
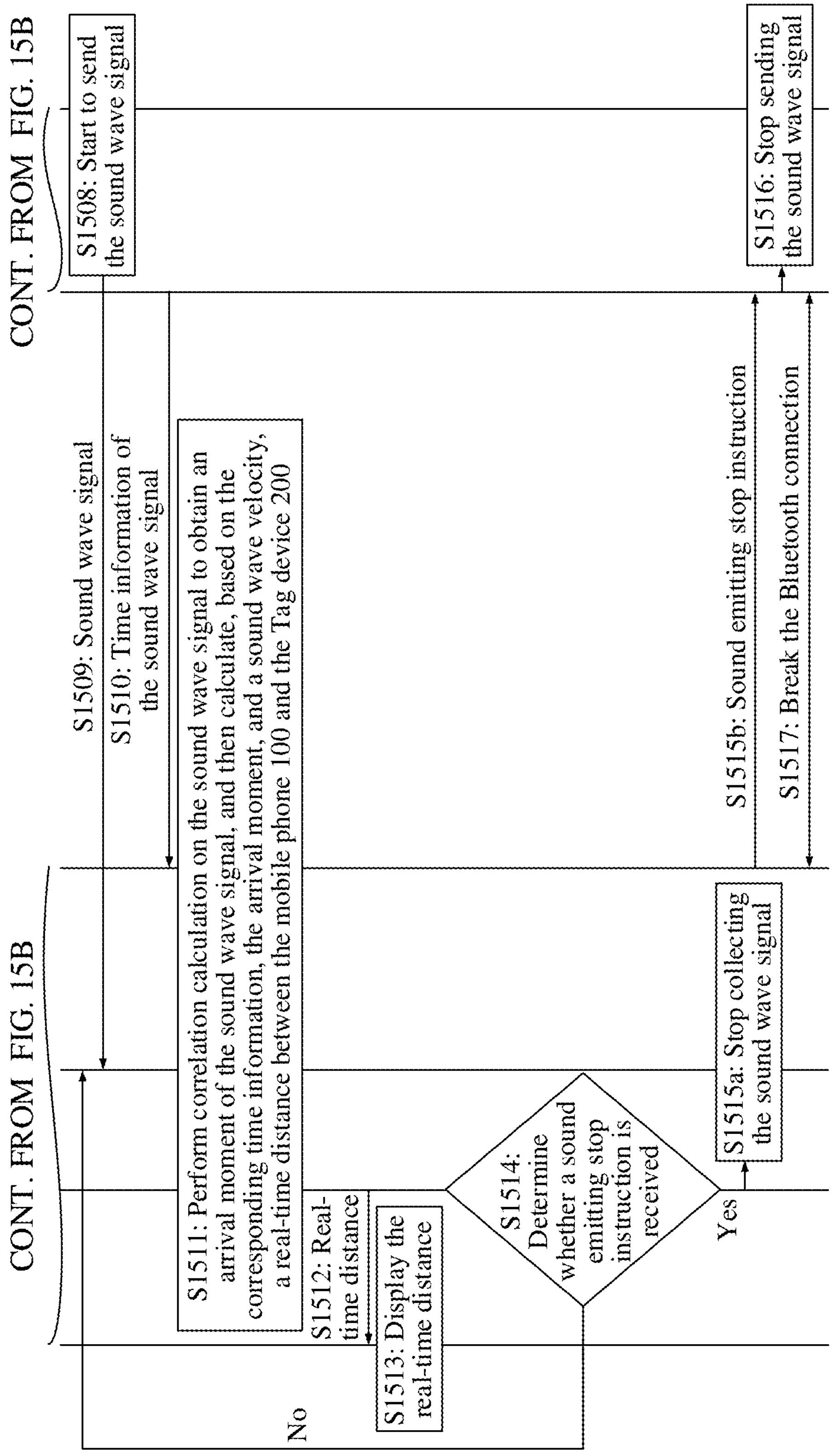

FIG. 15A and FIG. 15B are an interaction diagram corresponding to the distance measurement method in FIG. 14 according to at least one embodiment. The following describes the distance measurement method provided in at least one embodiment with reference to FIG. 15A and FIG. 15B. As shown in FIG. 15A and FIG. 15B, the distance measurement method in at least one embodiment includes the following steps.

Step S1501 to step S1506 are the same as step S1101 to step S1106, and details are not described herein again.

Step S1507: A Bluetooth module 201*a* sends an ACK to a Bluetooth module 101*a*.

Step S1508 to step S1517 are basically the same as step S1107 to step S1116, and details are not described herein again.

In conclusion, step S1507 is added in at least one embodiment. In this way, after performing time synchronization once, a mobile phone 100 periodically triggers a Tag device 200 to send a plurality of groups of sound wave signals for the mobile phone 100 to perform distance measurement. The mobile phone 100 may calculate and display a distance to the Tag device 200 in real time. This implements proper control on a measurement system.

In addition, in at least one embodiment, Bluetooth interaction information (for example, time synchronization information, sending time information, and temperature information) between the mobile phone 100 and the Tag device 200 is stored in a log. The sound wave signals are stored in a recording module of a microphone.

Figure 16:
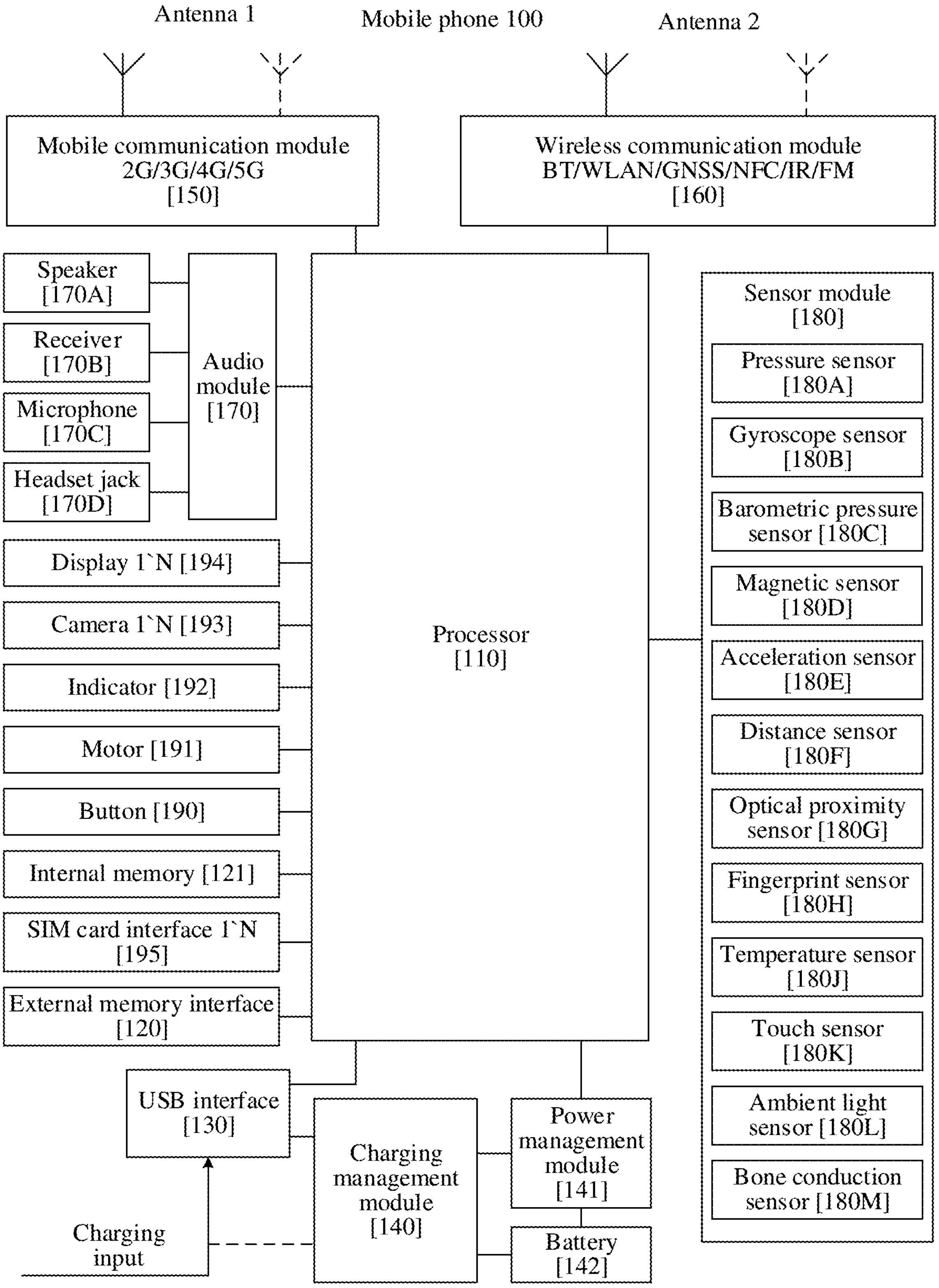
FIG. 16 is a diagram of a hardware structure of a mobile phone 100 according to at least one embodiment.

FIG. 16 is a diagram of a hardware structure of a mobile phone 100 according to at least one embodiment.

As shown in FIG. 16, the mobile phone 100 is used as an example, the mobile phone 100 may include a processor 110 (that is, the processor 103 described above), an external memory interface 120, an internal memory 121, a universal serial bus (USB) interface 130, a charging management module 140, a power management module 141, a battery 142, an antenna 1, an antenna 2, a mobile communication module 150, a wireless communication module 160 (that is, the communication module 101), an audio module 170 (that is, the audio module 102 described above), a speaker 170A, a receiver 170B, a microphone 170C, a headset jack 170D, a sensor module 180, a button 190, a motor 191, an indicator 192, a camera 193, a display 194 (that is, the display module 105 described above), a subscriber identity module (SIM) card interface 195, an EDL mode protection circuit, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors.

A memory may be further disposed in the processor 110, and is configured to store instructions and data. In some embodiments, the memory in the processor 110 is a cache. The memory may store instructions or data recently used or cyclically used by the processor 110. In response to the processor 110 using the instructions or the data again, the processor 110 may directly invoke the instructions or the data from the memory. This avoids repeated access, reduces a waiting time of the processor 110, and improves system efficiency. In some embodiments, the processor 110 may invoke and execute an instruction that is of the distance measurement method provided in at least one embodiment and that is stored in the memory, to implement the distance measurement method provided in at least one embodiment. In some other embodiments, the memory in the processor 110 may be further configured to store the foregoing first image file, an instruction corresponding to a preset signature method, a device identifier of the mobile phone 100, and the like.

In some embodiments, the processor 110 may include one or more interfaces. The interface may include an integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like. In some other embodiments, after the mobile phone 100 enters an EDL mode, a host device may establish a communication connection to the mobile phone 100 through the USB interface, to access data in the mobile phone 100.

The charging management module 140 is configured to receive a charging input from a charger. The charging management module 140 supplies power to the mobile phone 100 by using the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like.

A wireless communication function of the mobile phone 100 may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals.

The mobile communication module 150 may provide a wireless communication solution that is applied to the mobile phone 100 and that includes 2G/3G/4G/5G or the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 and at least some modules of the processor 110 may be disposed in a same component.

The wireless communication module 160 may provide a wireless communication solution that is applied to the mobile phone 100 and that includes a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, and the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

The mobile phone 100 implements a display function by using the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the mobile phone 100 may include one or N displays 194, where N is a positive integer greater than 1.

The camera 193 is configured to capture a static image or a video. An optical image of an object is generated through a lens, and is projected onto a photosensitive element. The photosensitive element may be a charge-coupled device (CCD) or a complementary metal-oxide-semiconductor (CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the mobile phone 100 may include one or N cameras 193, where N is a positive integer greater than 1.

The external memory interface 120 may be used to connect to an external storage card, for example, a micro SD card, to extend a storage capability of the mobile phone 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area. The program storage area may store an operating system, an application used by at least one function (for example, an application function corresponding to a function related to the Synergy service 12), and the like. The data storage area may store data created in a process of using the mobile phone 100, for example, is used to store a tar format file obtained after migrated data is packaged. In addition, the internal memory 121 may include a high-speed random access memory, and may further include a non-volatile memory, for example, at least one magnetic disk storage component, a flash storage component, or a universal flash storage (UFS). The processor 110 executes various function applications of the mobile phone 100 by running the instructions stored in the internal memory 121 and/or the instructions stored in the memory disposed in the processor 110.

The mobile phone 100 may implement an audio function, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal.

The speaker 170A, also referred to as a "loudspeaker", is configured to convert an audio electrical signal into a sound signal.

The receiver 170B, also referred to as an "earpiece", is configured to convert an audio electrical signal into a sound signal.

The microphone 170C, also referred to as a "mike" or a "mic", is configured to convert a sound signal into an electrical signal.

The headset jack 170D is configured to connect to a wired headset.

For example, the mobile phone 100 may further include one or more of a button 190, a motor 191, an indicator 192, a SIM card interface 195 (or an eSIM card), and the like.

An EDL short-circuiting protection circuit is coupled to at least one pin of a processor 110, and the EDL short-circuiting protection circuit includes at least one connection terminal. In response to the protection circuit in an EDL mode being valid, for example, in response to the circuit enabling the at least one pin of the processor, the mobile phone 100 may enter the EDL mode.

In some embodiments, the mobile phone 100 may further include a button (not shown), for example, a volume up button, a volume down button, or a power button. A user may enable the mobile phone 100 to enter the EDL mode by performing a combined operation on buttons of the mobile phone 100. For example, in response to the mobile phone 100 being in an off state, in response to detecting that a plurality of buttons of the volume up button, the volume down button, and the power button are simultaneously pressed, the mobile phone 100 enters the EDL mode. For another example, in response to the mobile phone 100 being in an off state, in response to detecting that a plurality of buttons of the volume up button, the volume down button, and the power button are simultaneously pressed, and the protection circuit in the EDL mode in the mobile phone 100 is in a valid state, the mobile phone 100 enters the EDL mode.

A structure of the mobile phone 100 shown in at least one embodiment does not constitute a specific limitation on the mobile phone 100. In at least one embodiment, the mobile phone 100 may include more or fewer components than those shown in the figure, or some components may be combined, or some components may be split, or components are arranged in different manners. The components shown in the figure may be implemented by hardware, software, or a combination of software and hardware.

Figure 17:
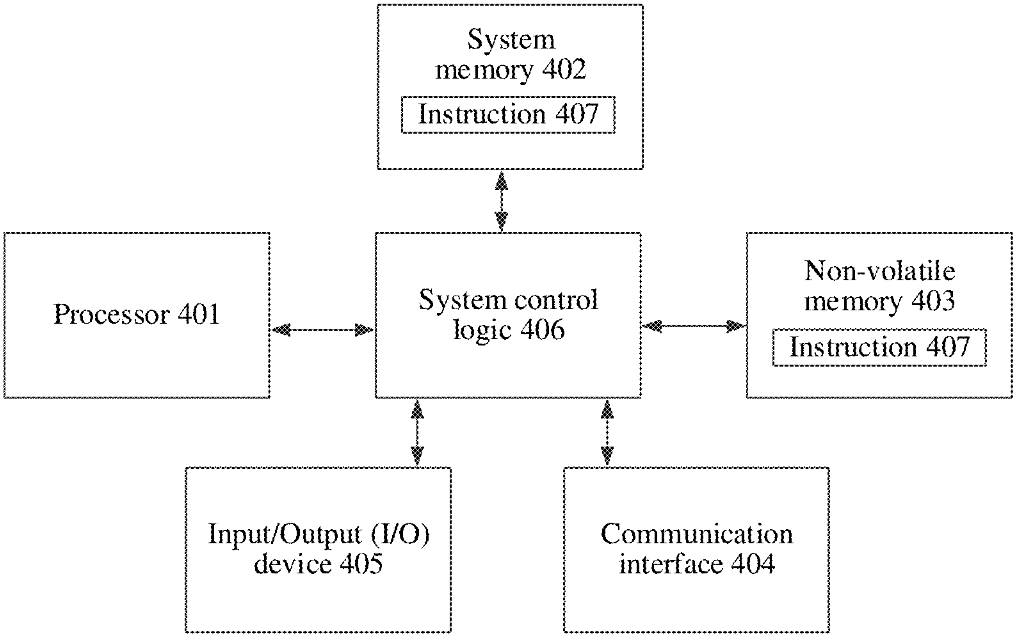
FIG. 17 is a diagram of a structure of a notebook computer 400 according to at least one embodiment.

Further, FIG. 17 is a diagram of a structure of another electronic device according to at least one embodiment. In at least one embodiment, the electronic device may be a notebook computer 400. As shown in FIG. 17, the notebook computer 400 includes one or more processors 401, a system memory 402, a non-volatile memory (NVM) 403, a communication interface 404, an input/output (I/O) device 405, and system control logic 406 configured to couple the processor 401, the system memory 402, the non-volatile memory 403, the communication interface 404, and the input/output (I/O) device 405.

The processor 401 may include one or more processing units, for example, may include a processing module or a processing circuit of a central processing unit CPU (Central Processing Unit), a graphics processing unit GPU (Graphics Processing Unit), a digital signal processor DSP (Digital Signal Processor), a microprocessor MCU (Micro-programmed Control Unit), an AI (Artificial Intelligence, artificial intelligence) processor, or a programmable logic device FPGA (Field Programmable Gate Array), or may include one or more single-core or multi-core processors. The processor 401 may be configured to execute instructions to implement the access control method provided in at least one embodiment.

The system memory 402 is a volatile memory, for example, a random access memory (RAM) or a double data rate synchronous dynamic random access memory (DDR SDRAM). The system memory is configured to temporarily store data and/or instructions. For example, in some embodiments, the system memory 402 may be configured to store the key identifier, the signature information, the device identifier of the mobile phone 100, and the like, or may be configured to store an instruction of a preset signature method corresponding to the key identifier.

The non-volatile memory 403 may include one or more tangible, non-transitory computer-readable media configured to store data and/or instructions. In some embodiments, the non-volatile memory 403 may include any proper non-volatile memory such as a flash memory and/or any proper non-volatile storage device, for example, a hard disk drive (HDD), a compact disc (CD), a digital versatile disc (DVD), or a solid-state drive (SSD). In some embodiments, the non-volatile memory 403 may alternatively be a removable storage medium, for example, a secure digital (SD) storage card. In some other embodiments, the non-volatile memory 403 may be configured to store the key identifier, the signature information, the device identifier of the mobile phone 100, and the like, or may be configured to store an instruction of a preset signature method corresponding to the key identifier.

Particularly, the system memory 402 and the non-volatile memory 403 may respectively include a temporary copy and a permanent copy of an instruction 407. The instruction 407 may include: in response to being executed by the processor 401, the notebook computer 400 is enabled to implement the access control method provided in at least one embodiment.

The communication interface 404 may include a transceiver, configured to provide a wired or wireless communication interface for the notebook computer 400, to communicate with any other proper device by using one or more networks. In some embodiments, the communication interface 404 may be integrated into another component of the notebook computer 400. For example, the communication interface 404 may be integrated into the processor 401. In some embodiments, the notebook computer 400 may communicate with another device through the communication interface 404. For example, the notebook computer 400 may obtain the device identifier of the mobile phone 100 and the key identifier from the mobile phone 100 through the communication interface 404, or may send the signature information and the instruction to the mobile phone 100.

The input/output (I/O) device 405 may include an input device such as a keyboard or a mouse, and an output device such as a monitor. A user may interact with the notebook computer 400 by using the input/output (I/O) device 405, for example, input instructions to a first application running on the notebook computer 400, to obtain a fuse bit file, a device identifier file, and the like of the mobile phone 100 from the mobile phone 100.

The system control logic 206 may include any suitable interface controller to provide any suitable interface with another module of the notebook computer 400. For example, in some embodiments, the system control logic 406 may include one or more memory controllers, to provide an interface connected to the system memory 402 and the non-volatile memory 403.

In some embodiments, at least one of the processors 401 may be packaged with logic of one or more controllers used for the system control logic 406, to form a system-in-package (SiP). In some other embodiments, at least one of the processors 401 may be further integrated on a same chip with logic of one or more controllers used for the system control logic 406, to form a system-on-a-chip (SoC).

A structure of the notebook computer 400 shown in at least one embodiment does not constitute a specific limitation on the electronic device. In at least one embodiment, the notebook computer 400 may include more or fewer components than those shown in the figure, or some components may be combined, or some components may be split, or components are arranged in different manners. The components shown in the figure may be implemented by hardware, software, or a combination of software and hardware.

Embodiments of a mechanism disclosed in at least one embodiment may be implemented in hardware, software, firmware, or a combination of these implementation methods. At least one embodiment may be implemented as a computer program or program code executed in a programmable system. The programmable system includes at least one processor, a storage system (including a volatile memory, a non-volatile memory, and/or a storage element), at least one input device, and at least one output device.

The program code may be used to input instructions to perform a function described in at least one embodiment and generate output information. The output information may be used in one or more output devices in a known manner. For a purpose of at least one embodiment, a processing system includes any system having a processor such as a digital signal processor (DSP), a microcontroller, an application-specific integrated circuit (ASIC), or a microprocessor.

The program code may be implemented in a high-level programming language or an object-oriented programming language to communicate with the processing system. The program code can also be implemented in an assembly language or a machine language in response to being used. The mechanism described in at least one embodiment is not limited to the scope of any particular programming language. In either case, the language may be a compiled language or an interpreted language.

Figure 18:
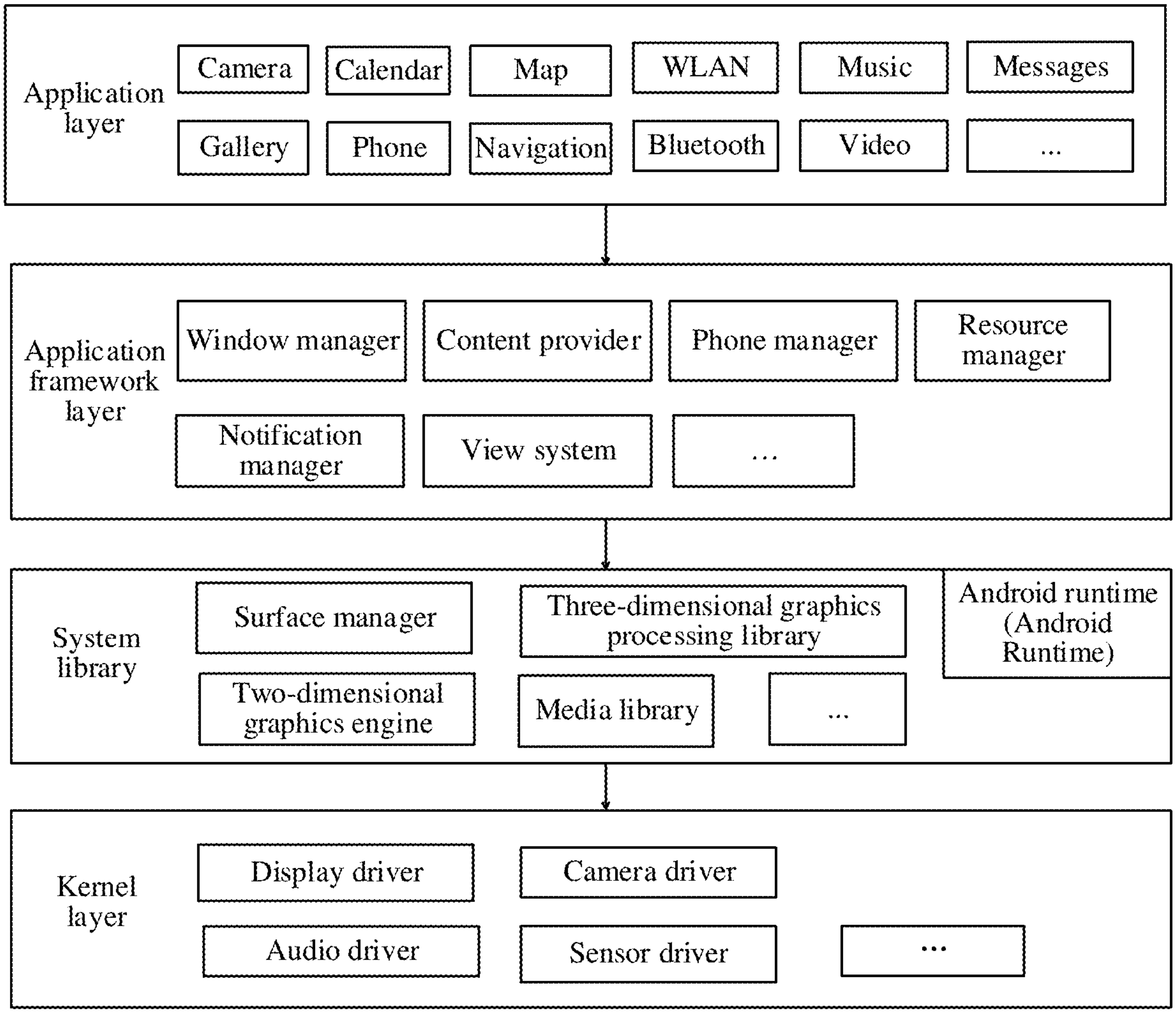
FIG. 18 is an architectural diagram of a mobile phone 100 according to at least one embodiment.

FIG. 18 is an architectural diagram of a mobile phone 100 according to at least one embodiment. As shown in FIG. 18, an application framework layer may include a window manager, a content provider, a view system, a phone manager, a resource manager, a notification manager, and the like.

The window manager is configured to manage a window program. The window manager may obtain a size of a display, determine whether there is a status bar, lock a screen, take a screenshot, and the like.

The content provider is configured to store and obtain data, and enable the data to be accessed by an application. The data may include a video, an image, audio, calls that are made and received, browsing history and bookmarks, a phone book, and the like.

The view system includes visual controls such as a control for displaying a text and a control for displaying an image. The view system may be used to construct an application. A display interface may include one or more views. For example, a display interface including an SMS message notification icon may include a text display view and an image display view.

The phone manager is configured to provide a communication function of the mobile phone 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without user interaction. For example, the notification manager is configured to notify download completion, give a message notification, and the like. The notification manager may alternatively be a notification that appears in a top status bar of a system in a form of a graph or a scroll bar text, for example, a notification of an application that is run on a background, or may be a notification that appears on a screen in a form of a dialog window. For example, text information is displayed in the status bar, an alert sound is played, an electronic device vibrates, or an indicator light blinks.

Android Runtime includes a kernel library and a virtual machine. The Android runtime is responsible for scheduling and management of an Android system.

The kernel library includes two parts: a function that is to be invoked in java language and a kernel library of Android.

An application layer and the application framework layer run on the virtual machine. The virtual machine executes java files at the application layer and the application framework layer as binary files. The virtual machine is configured to perform functions such as object lifecycle management, stack management, thread management, security and exception management, and garbage collection.

A kernel layer is a layer between hardware and software. The kernel layer includes at least a display driver, a camera driver, an audio driver, and a sensor driver.

A system library may include a plurality of functional modules, for example, a surface manager (SM), a media library (ML), a three-dimensional graphics processing library (for example, OpenGL ES), and a 2D graphics engine (for example, SGL).

The media library supports playback and recording in a plurality of commonly used audio and video formats, static image files, and the like. The media library may support a plurality of audio and video encoding formats such as MPEG-4, H.264, MP3, AAC, AMR, JPG, and PNG.

Embodiments of a mechanism disclosed in at least one embodiment may be implemented in hardware, software, firmware, or a combination of these implementation methods. At least one embodiment may be implemented as a computer program or program code executed in a programmable system. The programmable system includes at least one processor, a storage system (including a volatile memory, a non-volatile memory, and/or a storage element), at least one input device, and at least one output device.

The program code may be used to input instructions to perform a function described in at least one embodiment and generate output information. The output information may be used in one or more output devices in a known manner. For a purpose of at least one embodiment, a processing system includes any system having a processor such as a digital signal processor (DSP), a microcontroller, an application-specific integrated circuit (ASIC), or a microprocessor.

The program code may be implemented in a high-level programming language or an object-oriented programming language to communicate with the processing system. The program code can also be implemented in an assembly language or a machine language in response to being used. The mechanism described in at least one embodiment is not limited to the scope of any particular programming language. In either case, the language may be a compiled language or an interpreted language.

In some cases, the disclosed embodiments may be implemented in hardware, firmware, software, or any combination thereof. The disclosed embodiments may alternatively be implemented as instructions that are carried or stored on one or more transitory or non-transitory machine-readable (for example, computer-readable) storage media and that may be read and executed by one or more processors. For example, the instructions may be distributed by using a network or another computer-readable medium. Therefore, the machine-readable medium may include any mechanism for storing or transmitting information in a machine (for example, a computer)-readable form. The machine-readable medium includes but is not limited to a floppy disk, a compact disc, an optical disc, a compact disc read-only memory (CD-ROM), a magneto-optical disc, a read-only memory (ROM), a random access memory (RAM), an erasable programmable read-only memory (EPROM), an electrically erasable programmable read-only memory (EEPROM), a magnetic or an optical card, a flash memory, or a tangible machine-readable memory that is configured to transmit information (for example, a carrier, an infrared signal, or a digital signal) by using a propagating signal in an electrical, optical, acoustic, or another form over the Internet. Therefore, the machine-readable medium includes any type of machine-readable medium that is suitable for storing or transmitting electronic instructions or information in a machine (for example, a computer)-readable form.

In the accompanying drawings, some structural or method features may be shown in a particular arrangement and/or order. However, such a particular arrangement and/or order may not be needed. In some embodiments, these features may be arranged in a manner and/or order different from those/that shown in the descriptive accompanying drawings. In addition, inclusion of the structural or method features in a particular figure does not imply that such features are needed in all embodiments. In some embodiments, these features may not be included or may be combined with other another feature.

All units/modules mentioned in device embodiments are logical units/modules. Physically, one logical unit/module may be one physical unit/module, may be a part of one physical unit/module, or may be implemented by using a combination of a plurality of physical units/modules. Physical implementations of these logical units/modules are not the most important, and a combination of functions implemented by these logical units/modules is a key to resolve the technical problem provided in at least one embodiment. In addition, to highlight an innovative part of least one embodiment, a unit/module that is not closely related to resolving the technical problem provided in at least one embodiment is not introduced in the foregoing device embodiments. This does not mean that there are no other units/modules in the foregoing device embodiments.

In the examples and embodiments described herein, relational terms such as first and second are merely used to distinguish one entity or operation from another entity or operation, and do not necessarily use or imply any such actual relationship or order between these entities or operations. Moreover, the terms "include", "comprise", or any other variant thereof are intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a" does not, without more constraints, preclude the existence of additional identical elements in the process, method, article, or device that includes the element.

Although at least one embodiment has been illustrated and described with reference to some examples, a person of ordinary skill in the art should understand that various changes may be made to at least one embodiment in form and detail without departing from the scope of at least one embodiment.

What is claimed is:

1. A distance measurement method, comprising:

detecting, by a first electronic device, a distance measurement instruction;

detecting, by the first electronic device at a first moment, a first group of sound wave signals sent by a second electronic device, and determining, based on the first group of sound wave signals and first information corresponding to the first group of sound wave signals, a first distance that is between the first electronic device and the second electronic device and that corresponds to the first moment, wherein the first information comprises first sending time information of sending the first group of sound wave signals by the second electronic device;

displaying, by the first electronic device, the first distance;

detecting, by the first electronic device at a second moment after the first moment, a second group of sound wave signals sent by the second electronic device, and determining, based on the second group of sound wave signals and second information corresponding to the second group of sound wave signals, a second distance that is between the first electronic device and the second electronic device and that corresponds to the second moment, wherein the second information comprises second sending time information of sending the second group of sound wave signals by the second electronic device;

displaying, by the first electronic device, the second distance; and sending, by the first electronic device, a sound emitting instruction to the second electronic device, wherein the sound emitting instruction indicates the second electronic device to send sound wave signals, and the sound wave signals comprise the first group of sound wave signals and the second group of sound wave.

2. The distance measurement method according to claim 1, wherein the first electronic device receives the first information and the second information from the second electronic device.

3. The distance measurement method according to claim 1 further comprising sending, by, wherein the first electronic device, sends the first sending time information and the second sending time information to the second electronic device, so that the second electronic device sends the first group of sound wave signals based on the first sending time information, and the second electronic device sends the second group of sound wave signals based on the second sending time information.

4. The distance measurement method according to claim 1, further comprising:

detecting, by the first electronic device at a third moment, a third group of sound wave signals sent by the second electronic device, wherein the third moment is between the first moment and the second moment;

determining, by the first electronic device based on the first group of sound wave signals, the third group of sound wave signals, the first information, and third information corresponding to the third group of sound wave signals, the first distance that is between the first electronic device and the second electronic device and that corresponds to the first moment; and determining, by the first electronic device based on the second group of sound wave signals, the third group of sound wave signals, the second information, and the third information, the second distance that is between the first electronic device and the second electronic device and that corresponds to the second moment.

5. The distance measurement method according to claim 1, wherein the sending the sound wave signals includes sending the sound wave signals using a preset frequency range.

6. The distance measurement method according to claim 1, further comprising:

establishing, by the first electronic device, a Bluetooth connection to the second electronic device, and when received signal strength of a Bluetooth signal that is sent by the second electronic device and that is received by the first electronic device is greater than a preset strength threshold, starting to detect, by the first electronic device, the sound wave signals sent by the second electronic device.

7. The distance measurement method according to claim 6, further comprising:

performing, by the first electronic device at a third moment, Bluetooth time synchronization with the second electronic device, to determine a first time offset that is between the first electronic device and the second electronic device and that corresponds to the third moment; and determining, by the first electronic device based on the first time offset, the first group of sound wave signals, and the first information, a first distance after the third moment, and determining, by the first electronic device based on the first time offset, the second group of sound wave signals, and the second information, a second distance after the third moment.

8. The distance measurement method according to claim 7, further comprising:

performing, by the first electronic device at a fourth moment after preset duration of the third moment, the Bluetooth time synchronization with the second electronic device, to determine a second time offset that is between the first electronic device and the second electronic device and that corresponds to the fourth moment; and determining, by the first electronic device based on the second time offset, the first group of sound wave signals, and the first information, a first distance after the fourth moment, and determining, by the first electronic device based on the second time offset, the second group of sound wave signals, and the second information, a second distance after the fourth moment.

9. The distance measurement method according to claim 1, further comprising:

detecting, by the first electronic device, the distance measurement instruction when the first electronic device detects a distance measurement operation performed by a user on the first electronic device and the second electronic device and/or a search operation performed by the user on the second electronic device.

10. The distance measurement method according to claim 1, wherein the sending the first group of sound wave signals or the second group of sound wave signals includes using:

a frequency range of 20 Hz to $2*10^4$ Hz;

a frequency range of $2*10^4$ Hz to $1*10^{12}$ Hz; or a frequency range of 20 Hz to $1*10^{12}$ Hz.

11. An electronic device, comprising:

at least one processor; and one or more memories coupled to the at least one processor and storing programming instructions for execution by the at least one processor to cause the electronic device to perform operations comprising:

detecting a distance measurement instruction;

detecting, at a first moment, a first group of sound wave signals received from a second electronic device, and determining, based on the first group of sound wave signals and first information corresponding to the first group of sound wave signals, a first distance that is between the electronic device and the second electronic device and that corresponds to the first moment, wherein the first information comprises first sending time information of sending the first group of sound wave signals by the second electronic device;

displaying the first distance;

detecting at a second moment after the first moment, a second group of sound wave signals received from the second electronic device, and determining, based on the second group of sound wave signals and second information corresponding to the second group of sound wave signals, a second distance that is between the electronic device and the second electronic device and that corresponds to the second moment, wherein the second information comprises second sending time information of receiving the second group of sound wave signals from the second electronic device;

displaying the second distance; and sending a sound emitting instruction to the second electronic device, wherein the sound emitting instruction indicates the second electronic device to send sound wave signals, and the sound wave signals comprise the first group of sound wave signals and the second group of sound wave signals.

12. The electronic device according to claim 11, wherein the at least one processor is configured to receive the first information and the second information from the second electronic device.

13. The electronic device according to claim 11, wherein the at least one processor is configured to send the first sending time information and the second sending time information to the second electronic device, so that the second electronic device sends the first group of sound wave signals based on the first sending time information, and the second electronic device sends the second group of sound wave signals based on the second sending time information.

14. The electronic device according to claim 11, wherein the at least one processor is configured for:

detecting at a third moment, a third group of sound wave signals received from the second electronic device, wherein the third moment is between the first moment and the second moment;

determining, based on the first group of sound wave signals, the third group of sound wave signals, the first information, and third information corresponding to the third group of sound wave signals, the first distance that is between the electronic device and the second electronic device and that corresponds to the first moment; and determining, based on the second group of sound wave signals, the third group of sound wave signals, the second information, and the third information, the second distance that is between the electronic device and the second electronic device and that corresponds to the second moment.

15. The electronic device according to claim 11, wherein a frequency range of the sound wave signals is a preset frequency range.

16. The electronic device according to claim 11, wherein the at least one processor is configured for:

establishing, a Bluetooth connection to the second electronic device, and in response to receiving signal strength of a Bluetooth signal that is sent by the second electronic device and that is received is greater than a preset strength threshold, starting to detect the sound wave signals sent by the second electronic device.

17. The electronic device according to claim 16, wherein the at least one processor is configured for:

performing, at a third moment, Bluetooth time synchronization with the second electronic device, to determine a first time offset that is between the electronic device and the second electronic device and that corresponds to the third moment; and determining, based on the first time offset, the first group of sound wave signals, and the first information, a first distance after the third moment, and determining, by the electronic device based on the first time offset, the second group of sound wave signals, and the second information, a second distance after the third moment.

18. The electronic device according to claim 17, wherein the at least one processor is configured for:

performing, at a fourth moment after preset duration of the third moment, the Bluetooth time synchronization with the second electronic device, to determine a second time offset that is between the electronic device and the second electronic device and that corresponds to the fourth moment; and determining, based on the second time offset, the first group of sound wave signals, and the first information, a first distance after the fourth moment, and determining based on the second time offset, the second group of sound wave signals, and the second information, a second distance after the fourth moment.

* * * * *